US011470138B2

(12) United States Patent
Brueck et al.

(10) Patent No.: US 11,470,138 B2
(45) Date of Patent: *Oct. 11, 2022

(54) APPARATUS, SYSTEM, AND METHOD FOR MULTI-BITRATE CONTENT STREAMING

(71) Applicant: DISH Technologies L.L.C., Englewood, CO (US)

(72) Inventors: David F. Brueck, Saratoga Springs, UT (US); Mark B. Hurst, Cedar Hills, UT (US); R. Drew Major, Orem, UT (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/876,579

(22) Filed: May 18, 2020

(65) Prior Publication Data

US 2020/0280594 A1    Sep. 3, 2020

Related U.S. Application Data

(63) Continuation of application No. 16/004,056, filed on Jun. 8, 2018, now Pat. No. 10,659,513, which is a (Continued)

(51) Int. Cl.
  *H04L 29/06* (2006.01)
  *H04L 65/70* (2022.01)
  (Continued)

(52) U.S. Cl.
  CPC .......... *H04L 65/70* (2022.05); *G06F 16/183* (2019.01); *G06F 16/71* (2019.01); *H04L 47/12* (2013.01);
  (Continued)

(58) Field of Classification Search
  CPC ............ H04N 21/2662; H04N 21/8456; H04L 65/607; H04L 65/608; H04L 67/02
  See application file for complete search history.

(56) References Cited

U.S. PATENT DOCUMENTS 4,535,355 A    8/1985    Arn et al.
5,168,356 A   12/1992    Acampora et al.
(Continued)

FOREIGN PATENT DOCUMENTS

CA    2466482 A1    5/2003
EP    0365683 A1    5/1990
(Continued)

OTHER PUBLICATIONS

Krasic et al., Quality-Adaptive Media Streaming by Priority Drop, Oregon Graduate Institute, 2001.
(Continued)

*Primary Examiner* — Chirag R Patel
(74) *Attorney, Agent, or Firm* — KW Law, LLP

(57) ABSTRACT

An apparatus for multi-bitrate content streaming includes a receiving module configured to capture media content, a streamlet module configured to segment the media content and generate a plurality of streamlets, and an encoding module configured to generate a set of streamlets. The system includes the apparatus, wherein the set of streamlets comprises a plurality of streamlets having identical time indices and durations, and each streamlet of the set of streamlets having a unique bitrate, and wherein the encoding module comprises a master module configured to assign an encoding job to one of a plurality of host computing modules in response to an encoding job completion bid. A method includes receiving media content, segmenting the media content and generating a plurality of streamlets, and generating a set of streamlets.

30 Claims, 11 Drawing Sheets

Related U.S. Application Data continuation of application No. 15/414,025, filed on Jan. 24, 2017, now Pat. No. 9,998,516, which is a continuation of application No. 14/719,122, filed on May 21, 2015, now Pat. No. 9,571,551, which is a continuation of application No. 14/106,051, filed on Dec. 13, 2013, now Pat. No. 9,071,668, which is a continuation of application No. 13/617,114, filed on Sep. 14, 2012, now Pat. No. 8,612,624, which is a continuation of application No. 12/906,940, filed on Oct. 18, 2010, now Pat. No. 8,402,156, which is a continuation of application No. 11/673,483, filed on Feb. 9, 2007, now Pat. No. 7,818,444, which is a continuation-in-part of application No. 11/116,783, filed on Apr. 28, 2005, now Pat. No. 8,868,772.

(60) Provisional application No. 60/566,831, filed on Apr. 30, 2004.

(51) Int. Cl.

| | | |
|---|---|---|
| *H04L 47/80* | (2022.01) | |
| *H04L 47/12* | (2022.01) | |
| *G06F 16/71* | (2019.01) | |
| *G06F 16/182* | (2019.01) | |
| *H04N 7/24* | (2011.01) | |
| *H04N 21/2343* | (2011.01) | |
| *H04N 21/433* | (2011.01) | |
| *H04N 21/84* | (2011.01) | |
| *H04N 21/845* | (2011.01) | |
| *H04L 65/80* | (2022.01) | |
| *H04L 65/61* | (2022.01) | |
| *H04L 65/65* | (2022.01) | |
| *H04L 65/1101* | (2022.01) | |
| *H04L 67/60* | (2022.01) | |
| *H04L 67/568* | (2022.01) | |
| *H04L 67/02* | (2022.01) | |
| *H04L 65/1069* | (2022.01) | |
| *H04N 21/2662* | (2011.01) | |

(52) U.S. Cl.
CPC ........ *H04L 47/801* (2013.01); *H04L 65/1069* (2013.01); *H04L 65/1101* (2022.05); *H04L 65/61* (2022.05); *H04L 65/65* (2022.05); *H04L 65/80* (2013.01); *H04L 67/02* (2013.01); *H04L 67/568* (2022.05); *H04L 67/60* (2022.05); *H04N 7/24* (2013.01); *H04N 21/23439* (2013.01); *H04N 21/2662* (2013.01); *H04N 21/4331* (2013.01); *H04N 21/84* (2013.01); *H04N 21/8456* (2013.01)

(56) References Cited

U.S. PATENT DOCUMENTS

| | | |
|---|---|---|
| 5,267,334 A | 11/1993 | Normille et al. |
| 5,404,446 A | 4/1995 | Bowater et al. |
| 5,414,455 A | 5/1995 | Hooper et al. |
| 5,424,455 A | 6/1995 | Yamamoto et al. |
| 5,544,318 A | 8/1996 | Schmitz et al. |
| 5,687,095 A | 11/1997 | Haskell et al. |
| 5,732,183 A | 3/1998 | Sugiyama |
| 5,768,527 A | 6/1998 | Zhu et al. |
| 5,841,432 A | 11/1998 | Carmel et al. |
| 5,867,230 A | 2/1999 | Wang et al. |
| 5,933,603 A | 8/1999 | Vahalia et al. |
| 5,941,951 A | 8/1999 | Day et al. |
| 5,953,506 A | 9/1999 | Kalra et al. |
| 5,966,015 A | 10/1999 | Horii |
| 5,966,025 A | 10/1999 | Beffa |
| 5,996,025 A | 11/1999 | Day et al. |
| 6,003,030 A | 12/1999 | Kenner et al. |
| 6,091,775 A | 7/2000 | Hibi et al. |
| 6,091,777 A | 7/2000 | Guetz et al. |
| 6,112,239 A | 8/2000 | Kenner et al. |
| 6,122,660 A | 9/2000 | Baransky et al. |
| 6,154,744 A | 11/2000 | Kenner et al. |
| 6,172,672 B1 | 1/2001 | Ramasubramanian et al. |
| 6,181,867 B1 | 1/2001 | Kenner et al. |
| 6,185,736 B1 | 2/2001 | Ueno |
| 6,195,680 B1 | 2/2001 | Goldszmidt et al. |
| 6,292,383 B1 | 9/2001 | Worley |
| 6,292,834 B1 | 9/2001 | Ravi et al. |
| 6,366,614 B1 | 4/2002 | Pian et al. |
| 6,374,289 B2 | 4/2002 | Delaney et al. |
| 6,389,473 B1 | 5/2002 | Carmel et al. |
| 6,449,719 B1 | 9/2002 | Baker |
| 6,486,803 B1 | 11/2002 | Luby et al. |
| 6,490,627 B1 | 12/2002 | Kalra et al. |
| 6,498,897 B1 | 12/2002 | Nelson et al. |
| 6,510,553 B1 | 1/2003 | Hazra |
| 6,574,591 B1 | 6/2003 | Kleiman et al. |
| 6,604,118 B2 | 8/2003 | Klleiman et al. |
| 6,618,752 B1 | 9/2003 | Moore et al. |
| 6,625,643 B1 | 9/2003 | Colby et al. |
| 6,637,031 B1 | 10/2003 | Chou |
| 6,665,726 B1 | 12/2003 | Leighton et al. |
| 6,708,213 B1 | 3/2004 | Bommaiah et al. |
| 6,721,723 B1 | 4/2004 | Gibson et al. |
| 6,731,600 B1 | 5/2004 | Patel et al. |
| 6,757,796 B1 | 6/2004 | Hofmann |
| 6,760,772 B2 | 7/2004 | Zou et al. |
| 6,766,407 B1 | 7/2004 | Lisitsa et al. |
| 6,795,863 B1 | 9/2004 | Doty, Jr. |
| 6,845,107 B1 | 1/2005 | Kitazawa et al. |
| 6,850,965 B2 | 2/2005 | Allen |
| 6,859,839 B1 | 2/2005 | Zahorjan et al. |
| 6,874,015 B2 | 3/2005 | Kaminsky et al. |
| 6,968,387 B2 | 11/2005 | Lanphear |
| 6,976,090 B2 | 12/2005 | Ben-Shaul et al. |
| 7,047,307 B2 | 5/2006 | Li |
| 7,054,365 B2 | 5/2006 | Kim et al. |
| 7,054,774 B2 | 5/2006 | Batterberry et al. |
| 7,054,911 B1 | 5/2006 | Lango et al. |
| 7,075,986 B2 | 7/2006 | Girod et al. |
| 7,093,001 B2 | 8/2006 | Yang et al. |
| 7,096,271 B1 | 8/2006 | Omoigui et al. |
| 7,099,954 B2 | 8/2006 | Li et al. |
| 7,116,894 B1 | 10/2006 | Chatterton |
| 7,174,385 B2 | 2/2007 | Li |
| 7,194,549 B1 | 3/2007 | Lee et al. |
| 7,240,100 B1 | 7/2007 | Wein et al. |
| 7,260,640 B1 | 8/2007 | Kramer et al. |
| 7,274,740 B2 | 9/2007 | van Beek et al. |
| 7,295,520 B2 | 11/2007 | Lee et al. |
| 7,310,678 B2 | 12/2007 | Gunaseelan et al. |
| 7,325,073 B2 | 1/2008 | Shao et al. |
| 7,328,243 B2 | 2/2008 | Yaeger et al. |
| 7,330,908 B2 | 2/2008 | Jungek |
| 7,334,044 B1 | 2/2008 | Allen |
| 7,349,358 B2 | 3/2008 | Hennessey et al. |
| 7,349,976 B1 | 3/2008 | Glaser et al. |
| 7,369,610 B2 * | 5/2008 | Xu .................... H04N 21/2662 375/240.08 |
| 7,376,747 B2 | 5/2008 | Hartop |
| 7,386,627 B1 | 6/2008 | Lango et al. |
| 7,391,717 B2 | 6/2008 | Kiemets et al. |
| 7,408,984 B2 | 8/2008 | Lu et al. |
| 7,412,531 B1 | 8/2008 | Lango et al. |
| 7,477,688 B1 | 1/2009 | Zhang et al. |
| 7,523,181 B2 | 4/2009 | Swildens et al. |
| 7,536,469 B2 | 5/2009 | Chou et al. |
| 7,546,355 B2 | 6/2009 | Kalnitsky |
| 7,558,869 B2 | 7/2009 | Leon et al. |
| 7,577,750 B2 | 8/2009 | Shen et al. |
| 7,593,333 B2 | 9/2009 | Li et al. |
| 7,599,307 B2 | 10/2009 | Seckni et al. |
| 7,609,652 B2 | 10/2009 | Kellerer et al. |
| 7,653,735 B2 | 1/2010 | Mandato et al. |
| 7,707,303 B2 | 4/2010 | Albers et al. |

(56) References Cited

U.S. PATENT DOCUMENTS

| | | |
|---|---|---|
| 7,719,985 B2 | 5/2010 | Lee et al. |
| 7,760,801 B2 | 7/2010 | Ghanbari et al. |
| 7,779,135 B2 | 8/2010 | Hudson et al. |
| 7,788,395 B2 | 8/2010 | Bowra et al. |
| 7,797,439 B2 | 9/2010 | Cherkasova et al. |
| 7,817,985 B2 | 10/2010 | Moon |
| 7,818,444 B2 | 10/2010 | Brueck et al. |
| 7,925,781 B1 | 4/2011 | Chan et al. |
| 7,974,200 B2 | 7/2011 | Walker et al. |
| 8,036,265 B1 | 10/2011 | Reynolds et al. |
| 8,370,514 B2 | 2/2013 | Hurst et al. |
| 8,402,156 B2 | 3/2013 | Brueck et al. |
| 8,521,836 B2 | 8/2013 | Kewalramani et al. |
| 8,612,624 B2 | 12/2013 | Brueck et al. |
| 8,683,066 B2 | 3/2014 | Hurst et al. |
| 8,686,066 B2 | 4/2014 | Kwampian et al. |
| 8,711,701 B2 | 4/2014 | Ju |
| 8,818,127 B2 | 8/2014 | Hayata et al. |
| 8,868,772 B2 | 10/2014 | Major et al. |
| 8,880,721 B2 | 11/2014 | Hurst et al. |
| 9,344,496 B2 | 5/2016 | Hurst et al. |
| 9,407,564 B2 | 8/2016 | Major et al. |
| 9,462,074 B2 | 10/2016 | Guo et al. |
| 10,469,554 B2 | 11/2019 | Brueck et al. |
| 10,469,555 B2 | 11/2019 | Brueck et al. |
| 10,757,156 B2 | 8/2020 | Major et al. |
| 10,951,680 B2 | 3/2021 | Brueck et al. |
| 2001/0013128 A1 | 8/2001 | Hagai et al. |
| 2001/0047423 A1 | 11/2001 | Shao et al. |
| 2002/0002708 A1 | 1/2002 | Arye |
| 2002/0029274 A1 | 3/2002 | Allen |
| 2002/0044528 A1 | 4/2002 | Pogrebinsky et al. |
| 2002/0073167 A1 | 6/2002 | Powell et al. |
| 2002/0091840 A1 | 7/2002 | Pulier et al. |
| 2002/0097750 A1 | 7/2002 | Gunaseelan et al. |
| 2002/0131496 A1 | 9/2002 | Vasudevan et al. |
| 2002/0144276 A1 | 10/2002 | Radford et al. |
| 2002/0152317 A1 | 10/2002 | Wang et al. |
| 2002/0152318 A1 | 10/2002 | Menon et al. |
| 2002/0156912 A1 | 10/2002 | Hurst et al. |
| 2002/0161898 A1 | 10/2002 | Hartop et al. |
| 2002/0161908 A1 | 10/2002 | Benitez et al. |
| 2002/0161911 A1 | 10/2002 | Pinckney, III et al. |
| 2002/0169926 A1 | 11/2002 | Pinckney, III et al. |
| 2002/0170062 A1 | 11/2002 | Chen et al. |
| 2002/0174434 A1 | 11/2002 | Lee et al. |
| 2002/0176418 A1 | 11/2002 | Hunt et al. |
| 2002/0178330 A1 | 11/2002 | Schlowsky-Fischer et al. |
| 2002/0188745 A1 | 12/2002 | Hughes et al. |
| 2003/0005455 A1 | 1/2003 | Bowers |
| 2003/0009578 A1 | 1/2003 | Apostolopoulos et al. |
| 2003/0014684 A1 | 1/2003 | Kashyap |
| 2003/0018966 A1 | 1/2003 | Cook et al. |
| 2003/0021166 A1 | 1/2003 | Soloff |
| 2003/0021282 A1 | 1/2003 | Hospodor |
| 2003/0055995 A1 | 3/2003 | Honkola |
| 2003/0061305 A1 | 3/2003 | Copley et al. |
| 2003/0065803 A1 | 4/2003 | Heuvelman |
| 2003/0067872 A1 | 4/2003 | Harrell et al. |
| 2003/0067875 A1 | 4/2003 | Yoshida et al. |
| 2003/0072376 A1 | 4/2003 | Krishnamachari et al. |
| 2003/0081582 A1 | 5/2003 | Jain et al. |
| 2003/0093790 A1 | 5/2003 | Logan et al. |
| 2003/0107994 A1 | 6/2003 | Jacobs et al. |
| 2003/0135631 A1 | 7/2003 | Li et al. |
| 2003/0135863 A1 | 7/2003 | VanDer Schaar |
| 2003/0140159 A1 | 7/2003 | Campbell et al. |
| 2003/0151753 A1 | 8/2003 | Li et al. |
| 2003/0152036 A1 | 8/2003 | Quigg Brown et al. |
| 2003/0154239 A1 | 8/2003 | Davis et al. |
| 2003/0195977 A1 | 10/2003 | Liu et al. |
| 2003/0204519 A1 | 10/2003 | Sirivara et al. |
| 2003/0204602 A1 | 10/2003 | Hudson et al. |
| 2003/0233464 A1 | 12/2003 | Walpole et al. |
| 2003/0236904 A1 | 12/2003 | Walpole et al. |
| 2003/0236906 A1 | 12/2003 | Klemets et al. |
| 2004/0003101 A1 | 1/2004 | Roth et al. |
| 2004/0010613 A1 | 1/2004 | Apostolopoulos et al. |
| 2004/0030547 A1 | 2/2004 | Leaning et al. |
| 2004/0030599 A1 | 2/2004 | Sie et al. |
| 2004/0030797 A1 | 2/2004 | Akinlar et al. |
| 2004/0031054 A1 | 2/2004 | Dankworth et al. |
| 2004/0049780 A1 | 3/2004 | Gee |
| 2004/0054551 A1 | 3/2004 | Ausubel et al. |
| 2004/0071209 A1 | 4/2004 | Burg et al. |
| 2004/0083283 A1 | 4/2004 | Sundaram et al. |
| 2004/0093420 A1 | 5/2004 | Gamble |
| 2004/0103444 A1 | 5/2004 | Weinberg et al. |
| 2004/0117427 A1 | 6/2004 | Allen et al. |
| 2004/0136327 A1 | 7/2004 | Sitaraman et al. |
| 2004/0143672 A1* | 7/2004 | Padmanabham ... H04L 65/4084 709/231 |
| 2004/0168052 A1 | 8/2004 | Clisham et al. |
| 2004/0170392 A1 | 9/2004 | Lu et al. |
| 2004/0179032 A1 | 9/2004 | Huang |
| 2004/0199655 A1 | 10/2004 | Davies et al. |
| 2004/0202109 A1 | 10/2004 | Akiyama et al. |
| 2004/0220926 A1 | 11/2004 | Lamkin et al. |
| 2004/0221088 A1 | 11/2004 | Lisitsa et al. |
| 2004/0260701 A1 | 12/2004 | Lehikoinen et al. |
| 2004/0260827 A1 | 12/2004 | Wang |
| 2004/0267956 A1 | 12/2004 | Leon et al. |
| 2005/0015509 A1 | 1/2005 | Sitaraman |
| 2005/0033855 A1 | 2/2005 | Moradi et al. |
| 2005/0055425 A1* | 3/2005 | Lango ............ H04N 7/17318 709/219 |
| 2005/0066063 A1* | 3/2005 | Grigorovitch ..... H04N 21/6125 710/1 |
| 2005/0076136 A1 | 4/2005 | Cho et al. |
| 2005/0084166 A1 | 4/2005 | Bonch et al. |
| 2005/0108414 A1 | 5/2005 | Taylor et al. |
| 2005/0120107 A1 | 6/2005 | Kagan et al. |
| 2005/0123058 A1 | 6/2005 | Greenbaum et al. |
| 2005/0177618 A1 | 8/2005 | Zimler et al. |
| 2005/0185578 A1 | 8/2005 | Padmanabham et al. |
| 2005/0188051 A1 | 8/2005 | Sneh |
| 2005/0204046 A1 | 9/2005 | Watanabe |
| 2005/0207569 A1 | 9/2005 | Zhang et al. |
| 2005/0251832 A1 | 11/2005 | Chiueh |
| 2005/0262257 A1 | 11/2005 | Major et al. |
| 2006/0010003 A1 | 1/2006 | Kruse |
| 2006/0059223 A1 | 3/2006 | Klemets et al. |
| 2006/0075446 A1 | 4/2006 | Klemets et al. |
| 2006/0080718 A1 | 4/2006 | Gray et al. |
| 2006/0130118 A1 | 6/2006 | Damm |
| 2006/0133809 A1 | 6/2006 | Chow et al. |
| 2006/0165166 A1 | 7/2006 | Chou et al. |
| 2006/0168290 A1 | 7/2006 | Doron |
| 2006/0168295 A1 | 7/2006 | Batterberry et al. |
| 2006/0206246 A1 | 9/2006 | Walker |
| 2006/0236219 A1 | 10/2006 | Grigorovitch et al. |
| 2006/0277564 A1 | 12/2006 | Jarman |
| 2007/0024705 A1 | 2/2007 | Richter et al. |
| 2007/0030833 A1 | 2/2007 | Pirzada et al. |
| 2007/0067480 A1 | 3/2007 | Beek et al. |
| 2007/0079325 A1 | 4/2007 | de Heer |
| 2007/0094405 A1 | 4/2007 | Zhang |
| 2007/0204310 A1 | 8/2007 | Hua et al. |
| 2007/0280255 A1 | 12/2007 | Tsang et al. |
| 2008/0022343 A1 | 1/2008 | Hodzic et al. |
| 2008/0028428 A1 | 1/2008 | Jeong et al. |
| 2008/0037527 A1 | 2/2008 | Chan et al. |
| 2008/0046939 A1 | 2/2008 | Lu et al. |
| 2008/0056373 A1 | 3/2008 | Newlin et al. |
| 2008/0086570 A1 | 4/2008 | Dey et al. |
| 2008/0104647 A1 | 5/2008 | Hannuksela |
| 2008/0120330 A1 | 5/2008 | Reed et al. |
| 2008/0120342 A1 | 5/2008 | Reed et al. |
| 2008/0133766 A1 | 6/2008 | Luo |
| 2008/0162713 A1 | 7/2008 | Bowra et al. |
| 2008/0184688 A1 | 8/2008 | Daly et al. |
| 2008/0195744 A1 | 8/2008 | Bowra et al. |
| 2008/0205291 A1 | 8/2008 | Li et al. |
| 2008/0219151 A1 | 9/2008 | Ma et al. |

(56) References Cited

U.S. PATENT DOCUMENTS

| | | | |
|---|---|---|---|
| 2008/0222235 | A1 | 9/2008 | Hurst et al. |
| 2008/0263180 | A1 | 10/2008 | Hurst et al. |
| 2008/0281803 | A1 | 11/2008 | Gentric |
| 2009/0043906 | A1 | 2/2009 | Hurst et al. |
| 2009/0055471 | A1 | 2/2009 | Kozat et al. |
| 2009/0055547 | A1 | 2/2009 | Hudson et al. |
| 2009/0210549 | A1 | 8/2009 | Hudson et al. |
| 2010/0098103 | A1 | 4/2010 | Xiong et al. |
| 2010/0262711 | A1 | 10/2010 | Bouazizi |
| 2011/0307545 | A1 | 12/2011 | Bouazizi |
| 2015/0058496 | A1 | 2/2015 | Hurst et al. |

FOREIGN PATENT DOCUMENTS

| | | | |
|---|---|---|---|
| EP | 0919952 | A1 | 6/1999 |
| EP | 1202487 | A2 | 5/2002 |
| EP | 1298931 | A2 | 4/2003 |
| EP | 139497 | A2 | 3/2004 |
| EP | 1395014 | A1 | 3/2004 |
| EP | 1670256 | A2 | 6/2006 |
| EP | 1777969 | | 4/2007 |
| EP | 1394973 | B1 | 5/2010 |
| GB | 2367219 | A | 3/2002 |
| JP | 2000-201343 | | 7/2000 |
| JP | 200192752 | | 4/2001 |
| JP | 2004295569 | A | 10/2004 |
| JP | 2011004225 | A | 1/2011 |
| KR | 2005000116 | A | 1/2005 |
| WO | 2001067264 | A1 | 9/2001 |
| WO | 2002045372 | A1 | 6/2002 |
| WO | 0245372 | A3 | 9/2002 |
| WO | 2003009581 | A1 | 1/2003 |
| WO | 03041413 | A1 | 5/2003 |
| WO | 2003041413 | A1 | 5/2003 |
| WO | 2003042856 | A1 | 5/2003 |
| WO | 2004021668 | A1 | 3/2004 |
| WO | 2004025405 | A2 | 3/2004 |
| WO | 2004057832 | A1 | 7/2004 |
| WO | 2006010113 | A2 | 1/2006 |
| WO | 2006086717 | A1 | 8/2006 |

OTHER PUBLICATIONS

Krasic et al., QoS Scalability for Streamed Media Delivery, Oregon Graduate Institute School of Science & Engineering Technical Report CSE 99-011, Sep. 1999.

Huang et al., Adaptive Live Video Streaming by Priority Drop, Portland State University PDXScholar, Jul. 21, 2003.

Walpole et al, A Player for Adapctive MPEG Video Streaming Over the Internet, Oregon Graduate Institute of Science and Technology, Oct. 25, 2012.

Albanese, Andrew et al. "Priority Encoding Transmission", TR-94-039, Aug. 1994, 36 pgs, International Computer Science Institute, Berkeley, CA.

Birney, Bill "Intelligent Streaming", May 2003, Microsoft.

Goyal, Vivek K. "Multiple Description Coding: Compression Meets the Network," Sep. 2001, pp. 74-93, IEEE Signal Processing Magazine.

ON2 Technologies, Inc. "TrueMotion VP7 Video Codec" White Paper, Document Version 1.0, Jan. 10, 2005.

Pathan, Al-Mukaddim et al. "A Taxonomy and Survey of Content Delivery Networks" Australia, Feb. 2007, available at http://www.gridbus.org/reports/CDN-Taxonomy.pdf.

Puri, Rohit et al. "Multiple Description Source Coding Using Forward Error Correction Codes," Oct. 1999, 5 pgs., Department of Electrical Engineering and Computer Science, University of California, Berkeley, CA.

Wicker, Stephen B. "Error Control Systems for Digital Communication and Storage," Prentice-Hall, Inc., New Jersey, USA, 1995, parts 1-6.

Liu, Jiangchuan et al. "Opportunities and Challenged of Peer-to-Peer Internet Video Broadcast," School of Computing Science, Simon Fraser University, British Columbia, Canada.

Clement, B. "Move Networks closes $11.3 Million on First Round VC Funding," Page One PR, Move Networks, Inc. Press Releases, Feb. 7, 2007, http://www.move.tv/press/press20070201.html.

Move Networks, Inc. "The Next Generation Video Publishing System," Apr. 11, 2007; http://www.movenetworks.com/wp-content/uploads/move-networks-publishing-system.pdf.

Yoshimura, Takeshi et al. "Mobile Streaming Media CDN Enabled by Dynamic SMIL", NTT DoCoMo, Multimedia Laboratories and Hewlett-Packard Laboratories,dated May 7-11, 2002, ACM 1-58113-449-5/02/0005; http://www2002.org/CDROM/refereed/515/.

Nguyen, T. et al., Multiple Sender Distributed Video Streaming, IEEE Transactinos on Multimedia, IEEE Service Center, Piscataway, NJ, US, vol. 6, No. 2, Apr. 1, 2004, pp. 315-326, XP011109142, ISSN: 1520-9210, DOI: 10.1109/TMM,2003.822790.

Fujisawa, Hiroshi et al. "Implementaton of Efficient Access Mechanism for Multiple Mirror-Servers" IPSJ SIG Technical Report, vol. 2004, No. 9 (2004-DPS-116), Jan. 30, 2004, Information Processing Society of Japan, pp. 37-42.

Liu, Jiangchuan et al. "Adaptive Video Multicast Over the Internet" IEEE Computer Society, 2003.

"The meaning of performance factor—English-Japanese Weblio Dictionary", [online], Feb. 24, 2012, [searched on Feb. 24, 2012], the Internet <URL:http://ejje.weblio.jp/content/performance+factor>.

Tsuru, et al. "Recent evolution of the Internet measurement and inference techniques", IEICE Technical Report, vol. 103, No. 123, pp. 37-42, Jun. 12, 2003.

Rejaie, Reza et al. "Architectural Considerations for Playback of Quality Adaptive Video OVer the Internet" University of Southern California, Information Sciences Institute, 1998.

Roy, Sumit et al. "A System Architecture for Managing Mobile Streaming Media Services" Streaming Media Systems Group, Hewlett-Packard Laboratories, 2003.

Xu, Dongyan et al. "On Peer-to-Peer Media Streaming" Department of Computer Sciences, Purdue University, 2002.

Kozamerink, Franc "Media Streaming Over the Internet—An Over of Delivery Technologies" EBU Technical Review, Oct. 2002.

Lienhart, Rainer et al. "Challenges in Distributed Video Management and Delivery" Intel Corporation, EECS Dept., UC Berkeley, 2000-2002.

Zhang, Xinyan et al. "CoolStreaming/DONet: A Data-Driven Overlay Network for Peer-to-Peer Live Media Streaming" IEEE 2005.

Guo, Yang "DirectStream: A Directory-Based Peer-to-Peer Video Streaming Service" LexisNexis, Elsevier B.V. 2007.

Roy, S., et al., "Architecture of a Modular Streaming Media Server for Content Delivery Networks," 2002 IEEE. Published in the 2003 International Conference on Multimedia and Expo ICME 2003.

Bommaiah, E., et al., "Design and Implementation of a Caching System for Streaming Media over the Internet," 2000 IEEE. Published in RTAS '00 Proceedings of the Sixth IEEE Real Time Technology and Applications Symposium (RTAS 2000), p. 111.

Defendant Jadoo TV, Inc.'s Disclosure of Invalidity Contentions, U.S. N. Dist. Ca. Case No. 5:18-cv-05214-EJD dated Sep. 22, 2020.

Defendant Jadoo TV, Inc.'s Disclosure of Invalidity Contentions Appendix A, U.S. N. Dist. Ca. Case No. 5:18-cv-05214-EJD dated Sep. 22, 2020.

Balk et al., Adaptive Video Streaming: Pre-Encoded MPEG-4 with Bandwidth Scaling, 44 Computer Networks 415 (Mar. 2004).

RealPlayer Plus™ G2 Manual, RealNetworks Inc., Seattle, WA (1998-1999), pp. 1-77.

Kontothanassis, L. et al., "A Transport Layer for Live Streaming in a Content Delivery Network," Proceedings of the IEEE, 2004. pp. 1408-1419. (Retrieved Aug. 18, 2021 from https://www.akamai.com/it/it/multimedia/documents/technical-publication/a-transport-layer-forlive-streaming-in-a-content-delivery-network-technical-publication.pdf).

Dawson, F. "Improving Quality May Help to Boost Streaming Media," Multichannel News, Dec. 19, 1999. pp. 1-17 Yetrieved Aug. 18, 2021 from https://www.nexttv.com/news/improving-quality-may-help-boost-streaming-media-143325).

(56) References Cited

OTHER PUBLICATIONS

"InterVu Granted Key Internet Patent," Bloomberg Business, Dec. 16, 1999 pp. 1-3 (retrieved Aug. 18, 2021 from https://www.bloomberg.com/press-releases/1999-12-16/intervu-granted-key-internet-patent).
"InterVu Streams Ahead Behind the Scenes", Paul Festa, cnet, Jan. 2, 2002 (retrieved Aug. 18, 2021 from https://www.cnet.com/news/intervu-streams-ahead-behind-the-scenes/).
"Microsoft Announces Beta Release of Windows Media Technologies 4.0," Apr. 13, 1999, pp. 1-5 (retrieved Aug. 18, 2021 from https://news.microsoft.com/1999/04/13/microsoft-announcesbeta-release-of-windows-media-technologies-4-0/).
"Sandpiper Adds RealSystem G2 to its Content Delivery Network," CBR Staff, Aug. 4, 1999, pp. 1-4 (retrieved Aug. 18, 2021 from https://techmonitor.ai/techonology/sandpiper_adds_realsystem_g2_to_its_content_delivery_nnetwork.
"Speedera Posts Another Record Fiscal Year, Revenue Jumps 60 Percent," BusinessWire Digital Commerce 360, Jul. 14, 2004, pp. 1-5 (retrieved Aug. 18, 2021 from https://www.digitalcommerce360.com/2004/07/14/speedera-posts-another-record-fiscal-yearrevenue-jumps-60-perc/).
"Developer Documentation QuickTime 6", Apple Computer Inc., Cupertino, CA (2002), pp. 1-240.
"IBM Digital Library Version 2 Expands Its Comprehensive Solution Framework", Software Announcement, Aug. 12, 1997, pp. 1-26 (retrieved Aug. 18, 2021 from https://www-01.ibm.com/common/ssi/ShowDoc.wss?docURL=/common/ssi/rep_ca/2/897/ENUS297-312/index.html&request_locale=en).
"Fresh Approach: Axient founder finds another way to make networking payoff", Y. Tara Teichgraeber, Phoenix Business Journal, Jan. 13, 2002, pp. 1-6 (retrieved Aug. 18, 2021 from https://www.bizjournals.com/phoenix/stories/2002/01/14/story6.html).
Mac OS X Server QuickTime Streaming Server 5.0 Administration, Apple Computer Inc., Cupertino, CA (2003), pp. 1-65.
Respondents Lululemon Athletica Inc. and Curiouser Products Inc. Response to Complaint US Int'l Trade Commission Investigation. No. 337-TA-1265.
Respondent Peloton Interactive, Inc.'s Response to Complaint US Int'l Trade Commission Investigation. No 337-TA-1265.
Verified Response of Icon Health & Fitness, Inc., Free Motion Fitness, Inc., and Nordictrack, Inc. to Complaint US Int'l Trade Commission Investigation. No. 337-TA-1265.
Muntean, G-M., "A New Adaptive Multimedia Streaming System for All-iP Multi-Service Networks", IEEE Trans. on Broadcasting, Mar. 2004, pp. 1-10, vol. 50, No. 1.
Akamai buys InterVu, Feb. 7, 2000.
Akamai, Akamai Completes Acquisition of Speedera Networks.
Bill Gates Unveils the Next Wave of Digital Media with Windows Media 9 Series, Sep. 3, 2002.
Darwin Steaming Server Source Code Developer Notes, Jun. 15, 2021, Darwin Steaming Server 2.
IBM Goes Straight to Video—CNET, Jun. 15, 2021.
News in Brief: IBM VideoCharger, Dec. 18, 1996.
Birney, "Intelligent Streaming", May 21, 2021.
InterVu & Excalibur Partner to Deliver Live Internet Newscasts—Bloomberg, Dec. 9, 1999.
Introduction to Streaming Media with RealOne Player, Oct. 1, 2002.
Macromedia Delivers Macromedia Flash Communication Server MX Breakthrough server unifies communications and applications to deliver live, human interactions on the Internet, Jul. 9, 2002.
Press Releases: Macromedia Flash Media Server 2 Now Available. Flash Media Server 2 Brings the Power of the Flash Platform to Web Video.
Move Networks: The Story of a Failure—GigaOm.
QuickTime 6: Summary of Changes and Enhancements.
Chou, et al., "Rate-Distortion Optimized Receiver-Driven Streaming over Best-Effort Networks", IEEE Fourth Workshop on Multimedia Signal Processing, Oct. 3, 2001, pp. 1-10.
Festa P., RealNetworks tests G2, Jul. 13, 1998.
RealNetworks Production Guide, with RealOne Player, Oct. 1, 2002.
RealSystem G2 Production Guide BETA 1 Release.
Sandpiper Networks Signs Partner Deals—InternetNews, Oct. 7, 1999.
Topic, M. "Streaming Media Demystified", McGraw-Hill TELECOM, 2002.
Gallagher, B., "Streaming Video From End to End", ITProToday, Compute Engines, Feb. 28, 1999.
Move Networks: The Fall of Move Networks, Jan. 26, 2010.
Conklin, G.J., et al. "Video Coding for Streaming Media Delivery on the Internet", IEEE Trans. on Circuits and Systems for Video Technology, Mar. 3, 2001, pp. 281, vol. 11. No 3.
Claim Chart Against U.S. Pat. No. 10,469,554 ("'554 patent") Wang.
Claim Chart Against U.S. Pat. No. 10,469,554 ("'554 patent") Wu.
Claim Chart Against U.S. Pat. No. 10,469,554 ("'554 patent") Dey.
Claim Chart Against U.S. Pat. No. 10,469,554 ("'554 patent") Microsoft.
Claim Chart Against U.S. Pat. No. 9,407,564 ("'564 patent") Akiyama et al.
Claim Chart Against U.S. Pat. No. 9,407,564 ("'564 patent") Arye et al.
Claim Chart Against U.S. Pat. No. 9,407,564 ("'564 patent") Carmel et al.
Claim Chart Against U.S. Pat. No. 9,407,564 ("'564 patent") Chou et al.
Claim Chart Against U.S. Pat. No. 9,407,564 ("'564 patent") Durrant et al.
Claim Chart Against U.S. Pat. No. 9,407,564 ("'564 patent") Gentric.
Claim Chart Against U.S. Pat. No. 9,407,564 ("'564 patent") Kitamura.
Claim Chart Against U.S. Pat. No. 9,407,564 ("'564 patent") Klemets et al.
Claim Chart Against U.S. Pat. No. 9,407,564 ("'564 patent") Oplayo et al.
Claim Chart Against U.S. Pat. No. 9,407,564 ("'564 patent") QOAS.
Claim Chart Against U.S. Pat. No. 9,407,564 ("'564 patent") QuickTime Changes.
Claim Chart Against U.S. Pat. No. 9,407,564 ("'564 patent") QuickTime.
Claim Chart Against U.S. Pat. No. 9,407,564 ("'564 patent") Ravi.
Claim Chart Against U.S. Pat. No. 9,407,564 ("'564 patent") RealOne Player.
Claim Chart Against U.S. Pat. No. 9,407,564 ("'564 patent") Walker.
Claim Chart Against U.S. Pat. No. 9,407,564 ("'564 patent") Wang.
Claim Chart Against U.S. Pat. No. 9,407,564 ("'564 patent") Wu.
Claim Chart Against U.S. Pat. No. 9,407,564 ("'564 patent") RealSystem G2.
Claim Chart Against U.S. Pat. No. 10,469,554 ("'554 patent") Akiyama et al.
Claim Chart Against U.S. Pat. No. 10,469,554 ("'554 patent") Ayre.
Claim Chart Against U.S. Pat. No. 10,469,554 ("'554 patent") Carmel et al.
Claim Chart Against U.S. Pat. No. 10,469,554 ("'554 patent") Chou et al.
Claim Chart Against U.S. Pat. No. 10,469,554 ("'554 patent") Durrant et al.
Claim Chart Against U.S. Pat. No. 10,469,554 ("'554 patent") Gentric.
Claim Chart Against U.S. Pat. No. 10,469,554 ("'554 patent") Kitamura.
Claim Chart Against U.S. Pat. No. 10,469,554 ("'554 patent") Klemets.
Claim Chart Against U.S. Pat. No. 10,469,554 ("'554 patent") Oplayo.
Claim Chart Against U.S. Pat. No. 10,469,554 ("'554 patent") QOAS.
Claim Chart Against U.S. Pat. No. 10,469,554 ("'554 patent") QuickTime Changes.

(56) References Cited

OTHER PUBLICATIONS

Claim Chart Against U.S. Pat. No. 10,469,554 ("'554 patent") QuickTime.
Claim Chart Against U.S. Pat. No. 10,469,554 ("'554 patent") Ravi.
Claim Chart Against U.S. Pat. No. 10,469,554 ("'554 patent") RealOne Player.
Claim Chart Against U.S. Pat. No. 10,469,554 ("'554 patent") Walker.
DISH—Respondent's Joint Disclosure of Supplemental Invalidity Contentions in Response to Individual Interrogatories.
Mirror—Respondents Lululemon Athletica Inc. and Curiouser Products Inc. d/b/a Mirror First Amended Response to Complaint Under Section 337 of the Tariff Act of 1930, As Amended, Statement of Public Interestand Notice of Institution of Investigation.
Peloton—Respondent Peloton Interactive, Inc.'s First Amended Response to Complaint and to Notice of Investigation.
Icon—Respondents' Joint Disclosure of Initial Invalidity Contentions in Response to Individual Interrogatories.
Respondents' Notice of Prior Art.
Icon and Free Motion Fitness, Inc. Verified Response of Icon Health & Fitness, Inc., Free Motion Fitness, Inc., and Nordictrack, Inc. to Complaint of Dish DBS Corporation, Dish Technologies L.L.C., and Sling TV L.L.C. and to Notice of Investigation.
Investigation No. 337-TA-1265: Redacted Rebuttal Expert Report of Teresa Stanek Rea.
Investigation No. 337-TA-1265: Redacted Rebuttal Expert Report of Kevin Jeffay, Phd., Regarding Validity.
Investigation No. 337-TA-1265: Redacted Expert Report of Dr. Iain Richardson on Invalidity.
Investigation No. 337-TA-1265: Redacted Expert Report of Robert L. Stoll.
Investigation No. 337-TA-1265: Appendix A To Expert Report of Dr. Iain Richardson on Invalidity: Anticipation and Obviousness Over Carmel.
Investigation No. 337-TA-1265: Appendix B To Expert Report of Dr. Iain Richardson on Invalidity: Anticipation and Obviousness Over Akiyama.
Investigation No. 337-TA-1265: Appendix C-1 To Expert Report of Dr. Iain Richardson on Invalidity: Anticipation and Obviousness Over Realnetworks.
Investigation No. 337-TA-1265: Appendix C-2 To Expert Report of Dr. Iain Richardson on Invalidity: Realnetworks Experimentation.
Investigation No. 337-TA-1265: Appendix D To Expert Report of Dr. Iain Richardson on Invalidity: Anticipation and Obviousness Over Klemets.
Investigation No. 337-TA-1265: Exhibit E To Expert Report of Dr. Iain Richardson on Invalidity: Anticipation and Obviousness Over Oplayo.
Investigation No. 337-TA-1265: Appendix F To Expert Report of Dr. Iain Richardson on Invalidity: Anticipation and Obviousness Over Kikuchi.
Investigation No. 337-TA-1265: Appendix G To Expert Report of Dr. Iain Richardson on Invalidity: Anticipation and Obviousness Over Takemura.
Investigation No. 337-TA-1265: Appendix H To Expert Report of Dr. Iain Richardson on Invalidity: Public Use [Redacted].
Investigation No. 337-TA-1265: Exhibit 1 Dr. Iain Richardson curriculum vitae Dec. 21.
Investigation No. 337-TA-1265: Richardson Report Exhibit 3: Materials Condisered.
Investigation No. 337-TA-1265: Appendix A To Supplemental Expert Report if Dr. Iain Richardson [Redacted].
Investigation No. 337-TA-1265: Supplemental Expert Report of Robert L. Stoll.
Investigation No. 337-TA-1265: Supplemental Expert Report of Dr. Iain Richardson on Invalidity [Redacted].
Investigation No. 337-TA-1265: Supplemental Rebuttal Expert Report of Kevin Jeffay, PHD., Regarding Validity [Redacted].
Investigation No. 337-TA-1265: Supplemental Rebuttal Expert Report of Teresa Stanek Rea [Redacted].
Respondents' Post-Hearing Brief (Redacted) dated Mar. 29, 2022 (321 pages).
Complainants' Post-Hearing Reply Brief (Redacted) dated Apr. 7, 2022 (105 pages).
Commission Investigative Staffs Post-Hearing Reply Brief (Redacted) dated Apr. 13, 2022 (42 pages).
Commission Investigative Staff's Post-Hearing Brief (Redacted) dated Apr. 1, 2022 (311 pages).
Respondents' Reply Post-Hearing Brief (Redacted) dated Apr. 7, 2022 (106 pages).
Complainants' Post-Hearing Brief (Redacted) dated Mar. 29, 2022 (326 pages).
Appendix H, Appendix H to Expert Report of Dr. Iain Richardson on Invalidity: Public Use (40 pages).
The Wayback Machine, dated Nov. 8, 2021 (1 page).
In the Matter of: Certain Fitness Devices, Videotaped Deposition of BYU Broadcasting, Mark Mitchell, dated Dec. 2, 2021 (123 pages).
The Wayback Machine, bates labeled RESP-PA06323, dated Dec. 7, 2021 (1 page).
The Wayback Machine, bates labeled RESP-PA06257, dated Nov. 8, 2021 (1 page).
The Wayback Machine, bates labeled RESP-PA06256, dated Nov. 8, 2021 (1 page).
Move Media, bates labeled RESP-PA06253, dated Nov. 8, 2021 (1 page).
The Wayback Machine, bates labeled RESP-PA06252, dated Nov. 8, 2021 (1 page).
BYU Television, bates labeled RESP-PA06247 to RESP-PA06248, dated Nov. 8, 2021 (2 pages).
Mitchell Exhibit 13, BYU-TV Live, FAQ, bates labeled RESP-PA06275to RESP-PA06276, dated Dec. 2, 2021 (2 pages).
Mitchell Exhibit 12, BYU Television, The Wayback Machine, bates labeled RESP-PA06268- to RESP-PA06269, dated Dec. 2, 2021 (2 pages).
Mitchell Exhibit 11, BYU Television, The Wayback Machine, bates labeled RESP-PA06272 to RESP-PA06274, dated Dec. 2, 2021 (3 pages).
Mitchell Exhibit 10, BYU Television, The Wayback Machine, bates labeled RESP-PA06266 to RESP-PA06267, dated Dec. 2, 2021 (2 pages).
Mitchell Exhibit 7, BYU Television, The Wayback Machine, bates labeled RESP-PA06270 to RESP-PA06271, dated Dec. 2, 2021 (2 pages).
Mitchell Exhibit 6, bates labeled BYU000012-BYU000013, dated Dec. 2, 2021 (2 pages).
Mitchell Exhibit 5, BYU Television, The Wayback Machine, bates labeled RESP-PA06263 to RESP-PA06264, dated Dec. 2, 2021 (2 pages).
Mitchell Exhibit 4, BYU Television, The Wayback Machine, bates labeled RESP-PA06261 to RESP-PA06262, dated Dec. 2, 2021 (2 pages).
Mitchell Exhibit 3, BYU Television, The Wayback Machine, bates labeled BYU000001, dated Dec. 2, 2021 (1 page).
Mitchell Exhibit 2, Conference Summary for the 175th Semiannual General Conference, dated Dec. 2, 2021 (3 pages).
Major Exhibit 62, Official Report of the One Hundred Seventy-fifth Semiannual General Conference of The Church of Jesus Christ of Latter-day Saints, dated Nov. 5, 2021 (128 pages).
In the Matter of: In Re Certain Fitness Devices, Videotaped Deposition of Peloton Interactive, Inc., Drew Major, dated Dec. 17, 2021 (72 pages).
In the Matter of: In Re Certain Fitness Devices and Systems Containing Same, Videotaped Deposition of John Edwards, dated Nov. 12, 2021 (191 pages).
In the Matter of: In Re Certain Fitness Devices and Systems Containing Same, Videotaped Deposition of Robert Drew Major, dated Nov. 5, 2021 (268 pages).
Uncertified Rough Draft Transcript, Deposition of Mark Hurst, vol. 2, dated Dec. 3, 2021 (51 pages).
Hurst Exhibit 68, Move Media, dated Nov. 19, 2021 (1 page).
Bates labeled RESP-PA06326 to RESP-PA06337, dated Dec. 7, 2021 (12 pages).
Bates labeled RESP-PA06255 (1 page).

(56) References Cited

OTHER PUBLICATIONS

Bates labeled RESP-PA06254 (1 page).
International Search Report for EP application 20216568.4 dated Apr. 19, 2021 (15 pages).
Response to International Search Report filed with EP application 20216568.4 dated Nov. 19, 2021 (41 pages).

* cited by examiner

APPARATUS, SYSTEM, AND METHOD FOR MULTI-BITRATE CONTENT STREAMING

CROSS-REFERENCES TO RELATED APPLICATIONS

This application is a continuation of U.S. patent application Ser. No. 16/004,056 filed on Jun. 8, 2018, which is a continuation of U.S. patent application Ser. No. 15/414,025 (now U.S. Pat. No. 9,998,516) filed on Jan. 24, 2017, which is a continuation of U.S. patent application Ser. No. 14/719,122 filed on May 21, 2015, which is a continuation of U.S. patent application Ser. No. 14/106,051 filed on Dec. 13, 2013 (now U.S. Pat. No. 9,071,668), which is a continuation of U.S. patent application Ser. No. 13/617,114, filed on Sep. 14, 2012 (now U.S. Pat. No. 8,612,624), which is a continuation of U.S. patent Ser. No. 12/906,940 filed on Oct. 18, 2010 (now U.S. Pat. No. 8,402,156), which is a continuation of U.S. patent application Ser. No. 11/673,483, filed on Feb. 9, 2007 (now U.S. Pat. No. 7,818,444), which is a continuation-in-part of application Ser. No. 11/116,783, filed on Apr. 28, 2005 (now U.S. Pat. No. 8,868,772), which claims the benefit of U.S. Provisional Application No. 60/566,831, filed on Apr. 31, 2004, all of which are incorporated herein by reference.

BACKGROUND OF THE INVENTION

Field of the Invention

The invention relates to video streaming over packet switched networks such as the Internet, and more particularly relates to adaptive-rate shifting of streaming content over such networks.

Description of the Related Art

The Internet is fast becoming a preferred method for distributing media files to end users. It is currently possible to download music or video to computers, cell phones, or practically any network capable device. Many portable media players are equipped with network connections and enabled to play music or videos. The music or video files (hereinafter "media files") can be stored locally on the media player or computer, or streamed or downloaded from a server.

"Streaming media" refers to technology that delivers content at a rate sufficient for presenting the media to a user in real time as the data is received. The data may be stored in memory temporarily until played and then subsequently deleted. The user has the immediate satisfaction of viewing the requested content without waiting for the media file to completely download. Unfortunately, the audio/video quality that can be received for real time presentation is constrained by the available bandwidth of the user's network connection. Streaming may be used to deliver content on demand (previously recorded) or from live broadcasts.

Alternatively, media files may be downloaded and stored on persistent storage devices, such as hard drives or optical storage, for later presentation. Downloading complete media files can take large amounts of time depending on the network connection. Once downloaded, however, the content can be viewed repeatedly anytime or anywhere. Media files prepared for downloading usually are encoded with a higher quality audio/video than can be delivered in real time. Users generally dislike this option, as they tend to want to see or hear the media file instantaneously.

Streaming offers the advantage of immediate access to the content but currently sacrifices quality compared with downloading a file of the same content. Streaming also provides the opportunity for a user to select different content for viewing on an ad hoc basis, while downloading is by definition restricted to receiving a specific content selection in its entirety or not at all. Downloading also supports rewind, fast forward, and direct seek operations, while streaming is unable to fully support these functions. Streaming is also vulnerable to network failures or congestion.

Another technology, known as "progressive downloads," attempts to combine the strengths of the above two technologies. When a progressive download is initiated, the media file download begins, and the media player waits to begin playback until there is enough of the file downloaded that playback can begin with the hope that the remainder of the file will be completely downloaded before playback "catches up." This waiting period before playback can be substantial depending on network conditions, and therefore is not a complete or fully acceptable solution to the problem of media presentation over a network.

Generally, three basic challenges exist with regard to data transport streaming over a network such as the Internet that has a varying amount of data loss. The first challenge is reliability. Most streaming solutions use a TCP connection, or "virtual circuit," for transmitting data. A TCP connection provides a guaranteed delivery mechanism so that data sent from one endpoint will be delivered to the destination, even if portions are lost and retransmitted. A break in the continuity of a TCP connection can have serious consequences when the data must be delivered in real-time. When a network adapter detects delays or losses in a TCP connection, the adapter "backs off" from transmission attempts for a moment and then slowly resumes the original transmission pace. This behavior is an attempt to alleviate the perceived congestion. Such a slowdown is detrimental to the viewing or listening experience of the user and therefore is not acceptable.

The second challenge to data transport is efficiency. Efficiency refers to how well the user's available bandwidth is used for delivery of the content stream. This measure is directly related to the reliability of the TCP connection. When the TCP connection is suffering reliability problems, a loss of bandwidth utilization results. The measure of efficiency sometimes varies suddenly, and can greatly impact the viewing experience.

The third challenge is latency. Latency is the time measure form the client's point-of-view, of the interval between when a request is issued and the response data begins to arrive. This value is affected by the network connection's reliability and efficiency, and the processing time required by the origin to prepare the response. A busy or overloaded server, for example, will take more time to process a request. As well as affecting the start time of a particular request, latency has a significant impact on the network throughput of TCP.

From the foregoing discussion, it should be apparent that a need exists for an apparatus, system, and method that alleviate the problems of reliability, efficiency, and latency. Additionally, such an apparatus, system, and method would offer instantaneous viewing along with the ability to fast forward, rewind, direct seek, and browse multiple streams. Beneficially, such an apparatus, system, and method would utilize multiple connections between a source and destination, requesting varying bitrate streams depending upon network conditions.

SUMMARY OF THE INVENTION

The present invention has been developed in response to the present state of the art, and in particular, in response to the problems and needs in the art that have not yet been fully solved by currently available content streaming systems. Accordingly, the present invention has been developed to provide an apparatus, system, and method for adaptive-rate content streaming that overcome many or all of the above-discussed shortcomings in the art.

The apparatus for adaptive-rate content streaming is provided with a logic unit containing a plurality of modules configured to functionally execute the necessary steps. These modules in the described embodiments include a receiving module configured to receive media content, a streamlet module configured to segment the media content and generate a plurality of sequential streamlets, and an encoding module configured to encode each streamlet as a separate content file.

The encoding module is further configured to generate a set of streamlets for each of the sequential streamlets. Each streamlet may comprise a portion of the media content having a predetermined length of time. The predetermined length of time may be in the range of between about 0.1 and 5 seconds.

In one embodiment, a set of streamlets comprises a plurality of streamlets having identical time indices, and each streamlet of the set of streamlets has a unique bitrate. The receiving module is configured to convert the media content to raw audio or raw video. The encoding module may include a master module configured to assign an encoding job to one of a plurality of host computing modules in response to an encoding job completion bid. The job completion bid may be based on a plurality of computing variables selected from a group consisting of current encoding job completion percentage, average encoding job completion time, processor speed, and physical memory capacity.

A system of the present invention is also presented for adaptive-rate content streaming. In particular, the system, in one embodiment, includes a receiving module configured to receive media content, a streamlet module configured to segment the media content and generate a plurality of sequential streamlets, each streamlet comprising a portion of the media content having a predetermined length of time, and an encoding module configured to encode each streamlet as a separate content file and generate a set of streamlets.

The system also includes a plurality of streamlets having identical time indices and each streamlet of the set of streamlets having a unique bitrate. The encoding module comprises a master module configured to assign an encoding job to one of a plurality of host computing modules in response to an encoding job completion bid.

A method of the present invention is also presented for adaptive-rate content streaming. In one embodiment, the method includes receiving media content, segmenting the media content and generating a plurality of sequential streamlets, and encoding each streamlet as a separate content file.

The method also includes segmenting the media content into a plurality of streamlets, each streamlet comprising a portion of the media content having a predetermined length of time. In one embodiment, the method includes generating a set of streamlets comprising a plurality of streamlets having identical time indices, and each streamlet of the set of streamlets having a unique bitrate.

Furthermore, the method may include converting the media content to raw audio or raw video, and segmenting the content media into a plurality of sequential streamlets. The method further comprises assigning an encoding job to one of a plurality of host computing modules in response to an encoding job completion bid, and submitting an encoding job completion bid based on a plurality of computing variables.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
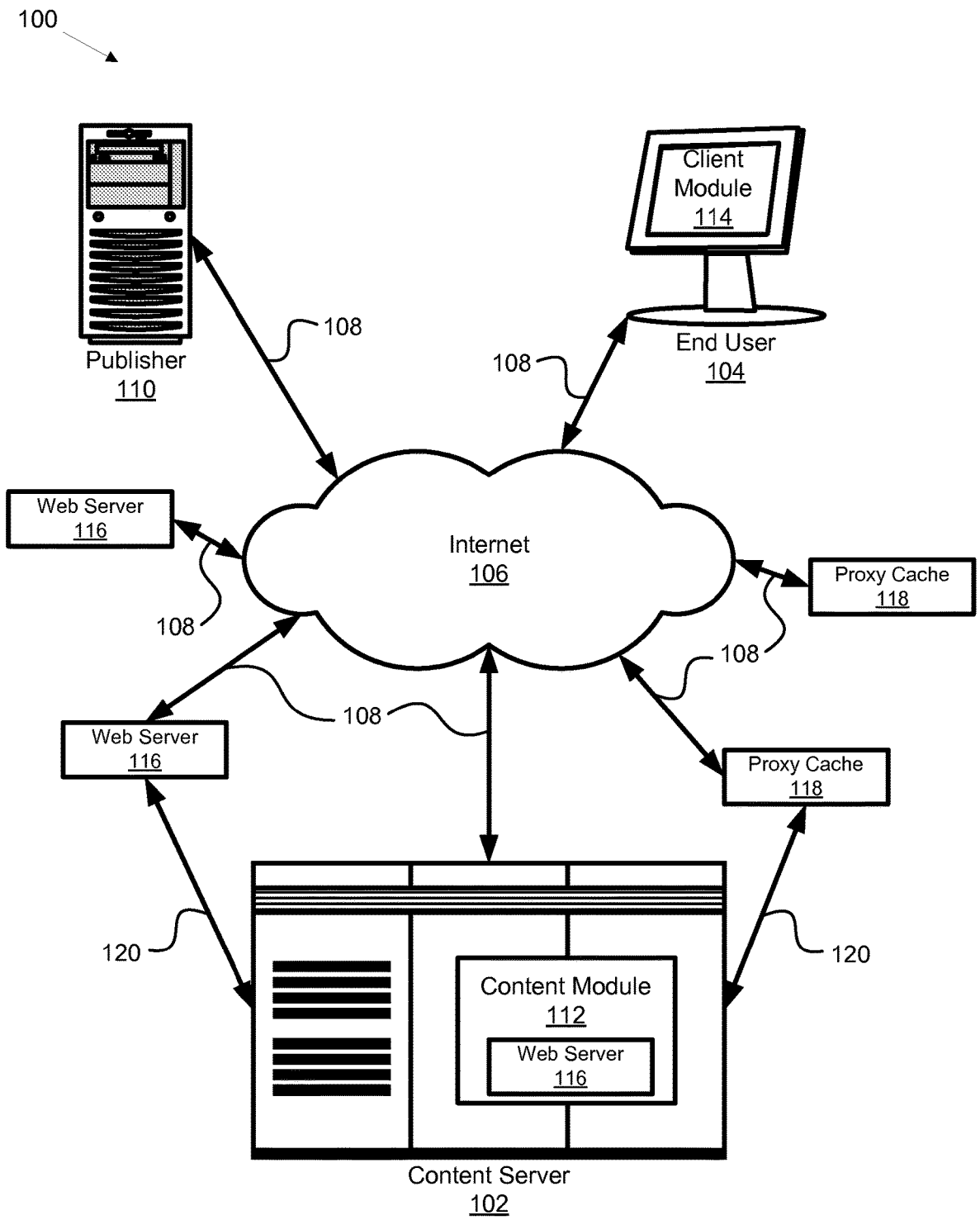
FIG. 1 is a schematic block diagram illustrating one embodiment of a system for dynamic rate shifting of streaming content in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment." or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device. In one embodiment, a computer program product including a computer useable medium having a computer readable program of computer instructions stored thereon that when executed on a computer causes the computer to carry out operations for multi-bitrate content streaming as described herein.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a system 100 for dynamic rate shifting of streaming content in accordance with the present invention. In one embodiment, the system 100 comprises a content server 102 and an end user station 104. The content server 102 and the end user station 104 may be coupled by a data communications network. The data communications network may include the Internet 106 and connections 108 to the Internet 106. Alternatively, the content server 102 and the end user 104 may be located on a common local area network, wireless area network, cellular network, virtual local area network, or the like. The end user station 104 may comprise a personal computer (PC), an entertainment system configured to communicate over a network, or a portable electronic device configured to present content. For example, portable electronic devices may include, but are not limited to, cellular phones, portable gaming systems, and portable computing devices.

In the depicted embodiment, the system 100 also includes a publisher 110, and a web server 116. The publisher 110 may be a creator or distributor of content. For example, if the content to be streamed were a broadcast of a television program, the publisher 110 may be a television or cable network channel such as NBC®, or MTV®. Content may be transferred over the Internet 106 to the content server 102, where the content is received by a content module 112. The content module 112 may be configured to receive, process, and store content. In one embodiment, processed content is accessed by a client module 114 configured to play the content on the end user station 104. In a further embodiment, the client module 114 is configured to receive different portions of a content stream from a plurality of locations simultaneously. For example, the client module 114 may request and receive content from any of the plurality of web servers 116.

Content from the content server 102 may be replicated to other web servers 116 or alternatively to proxy cache servers 118. Replicating may occur by deliberate forwarding from the content server 102, or by a web, cache, or proxy server outside of the content server 102 asking for content on behalf of the client module 114. In a further embodiment, content may be forwarded directly to web 116 or proxy 118 servers through direct communication channels 120 without the need to traverse the Internet 106.

Figure 2A:
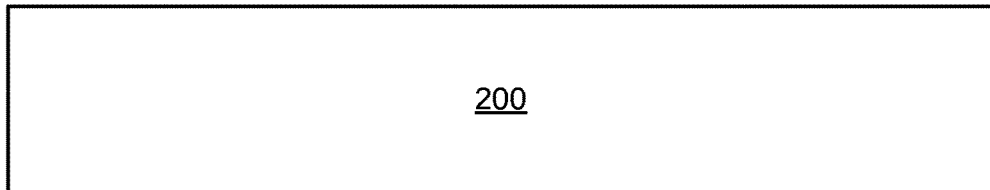
FIG. 2a is a schematic block diagram graphically illustrating one embodiment of a media content file.

FIG. 2a is a schematic block diagram graphically illustrating one embodiment of a media content (hereinafter "content") file 200. In one embodiment, the content file 200 is distributed by the publisher 110. The content file 200 may comprise a television broadcast, sports event, movie, music, concert, etc. The content file 200 may also be live or archived content. The content file 200 may comprise uncompressed video and audio, or alternatively, video or audio. Alternatively, the content file 200 may be compressed using standard or proprietary encoding schemes. Examples of encoding schemes capable of use with the present invention include, but are not limited to, DivX®, Windows Media Video®, Quicktime Sorenson 3®, On2, OGG Vorbis, MP3, or Quicktime 6.5/MPEG-4® encoded content.

Figure 2B:
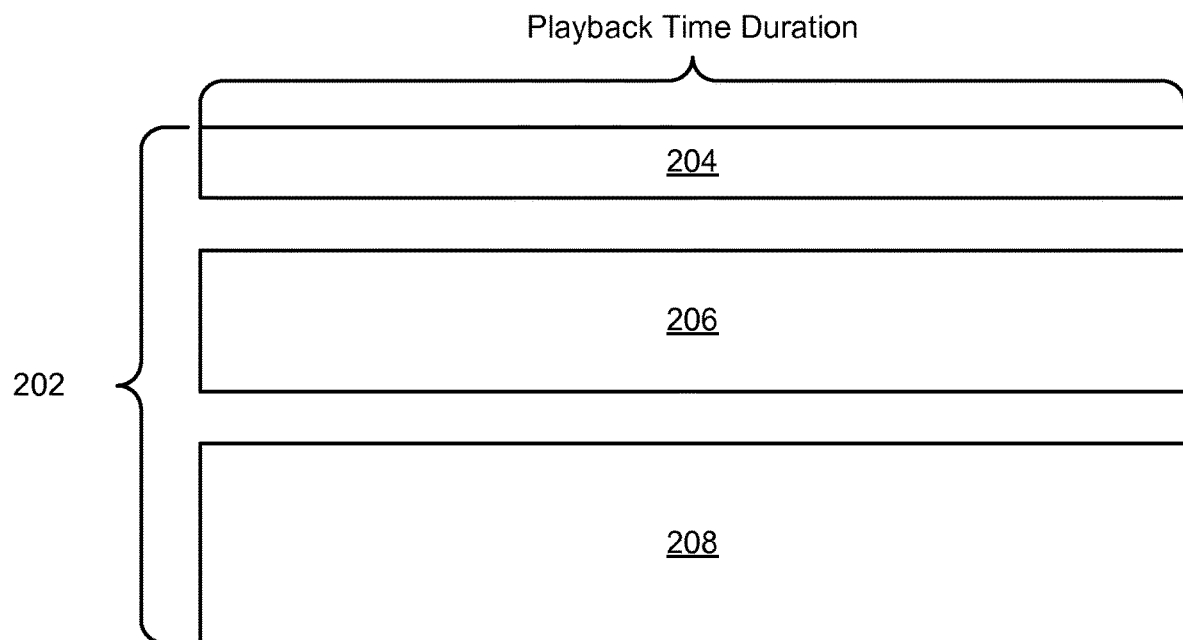
FIG. 2b is a schematic block diagram illustrating one embodiment of a plurality of streams having varying degrees of quality and bandwidth.

FIG. 2b is a schematic block diagram illustrating one embodiment of a plurality of streams 202 having varying degrees of quality and bandwidth. In one embodiment, the plurality of streams 202 comprises a low quality stream 204, a medium quality stream 206, and a high quality stream 208. Each of the streams 204, 206, 208 is a copy of the content file 200 encoded and compressed to varying bit rates. For example, the low quality stream 204 may be encoded and compressed to a bit rate of 100 kilobits per second (kbps), the medium quality stream 206 may be encoded and compressed to a bit rate of 200 kbps, and the high quality stream 208 may be encoded and compressed to 600 kbps.

Figure 3A:
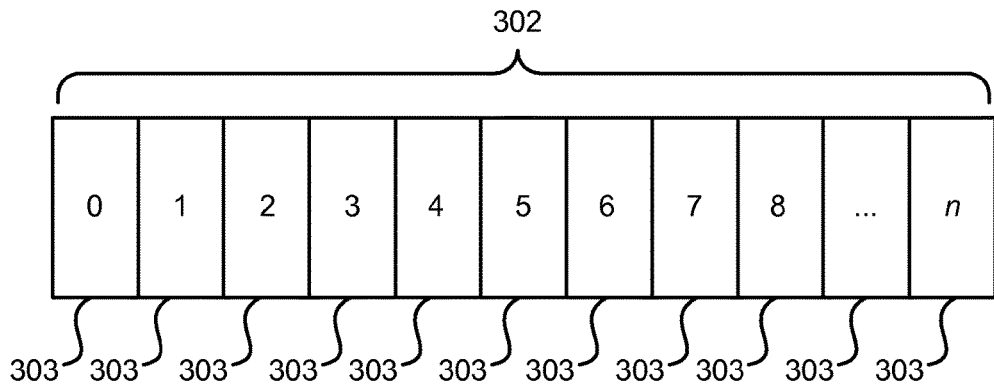
FIG. 3a is a schematic block diagram illustrating one embodiment of a stream divided into a plurality of source streamlets.

FIG. 3a is a schematic block diagram illustrating one embodiment of a stream 302 divided into a plurality of source streamlets 303. As used herein, streamlet refers to any sized portion of the content file 200. Each streamlet 303 may comprise a portion of the content contained in stream 302, encapsulated as an independent media object. The content in a streamlet 303 may have a unique time index in relation to the beginning of the content contained in stream 302. In one embodiment, the content contained in each streamlet 303 may have a duration of two seconds. For example, streamlet 0 may have a time index of 00:00 representing the beginning of content playback, and streamlet 1 may have a time index of 00:02, and so on. Alternatively, the time duration of the streamlets 304 may be any duration smaller than the entire playback duration of the content in stream 302. In a further embodiment, the streamlets 303 may be divided according to file size instead of a time index and duration.

Figure 3B:
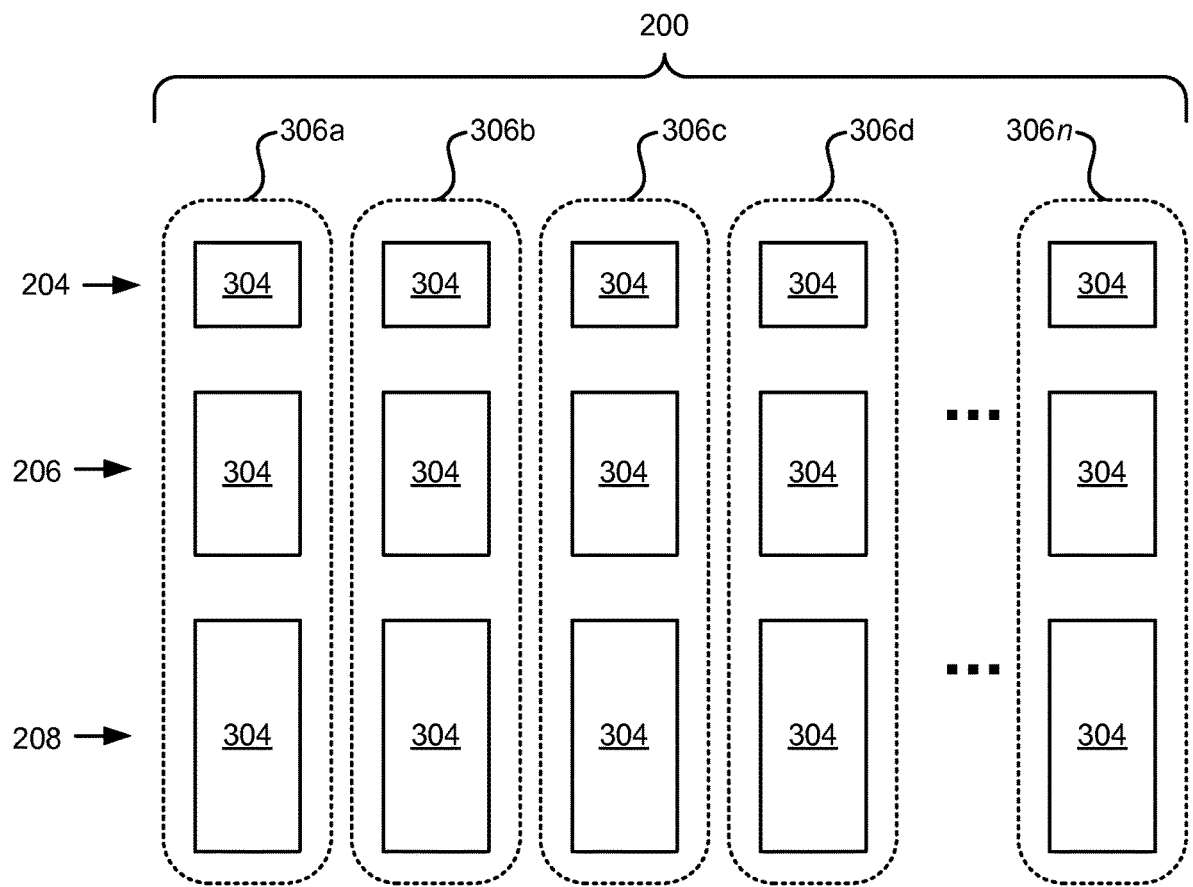
FIG. 3b is a schematic block diagram illustrating one embodiment of sets of streamlets in accordance with the present invention.

FIG. 3b is a schematic block diagram illustrating one embodiment of sets 306 of streamlets in accordance with the present invention. As used herein, the term "set" refers to a group of streamlets having identical time indices and durations but varying bitrates. In the depicted embodiment, the set 306a encompasses all streamlets having a time index of 00:00. The set 306a includes encoded streamlets 304 having low, medium, and high 204, 206, 208 bitrates. Of course each set 306 may include more than the depicted three bitrates which are given by way of example only. One skilled in the art will recognize that any number of streams having different bitrates may be generated from the original content 200.

As described above, the duration of one streamlet 304 may be approximately two seconds. Likewise each set 306 may comprise a plurality of streamlets 304 where each streamlet 304 has a playable duration of two seconds. Alternatively, the duration of the streamlet 304 may be predetermined or dynamically variable depending upon a variety of factors including, but not limited to, network congestion, system specifications, playback resolution and quality, etc. In the depicted embodiment, the content 200 may be formed of the plurality of sets 306. The number of sets 306 may depend on the length of the content 200 and the length or duration of each streamlet 304.

Figure 4:
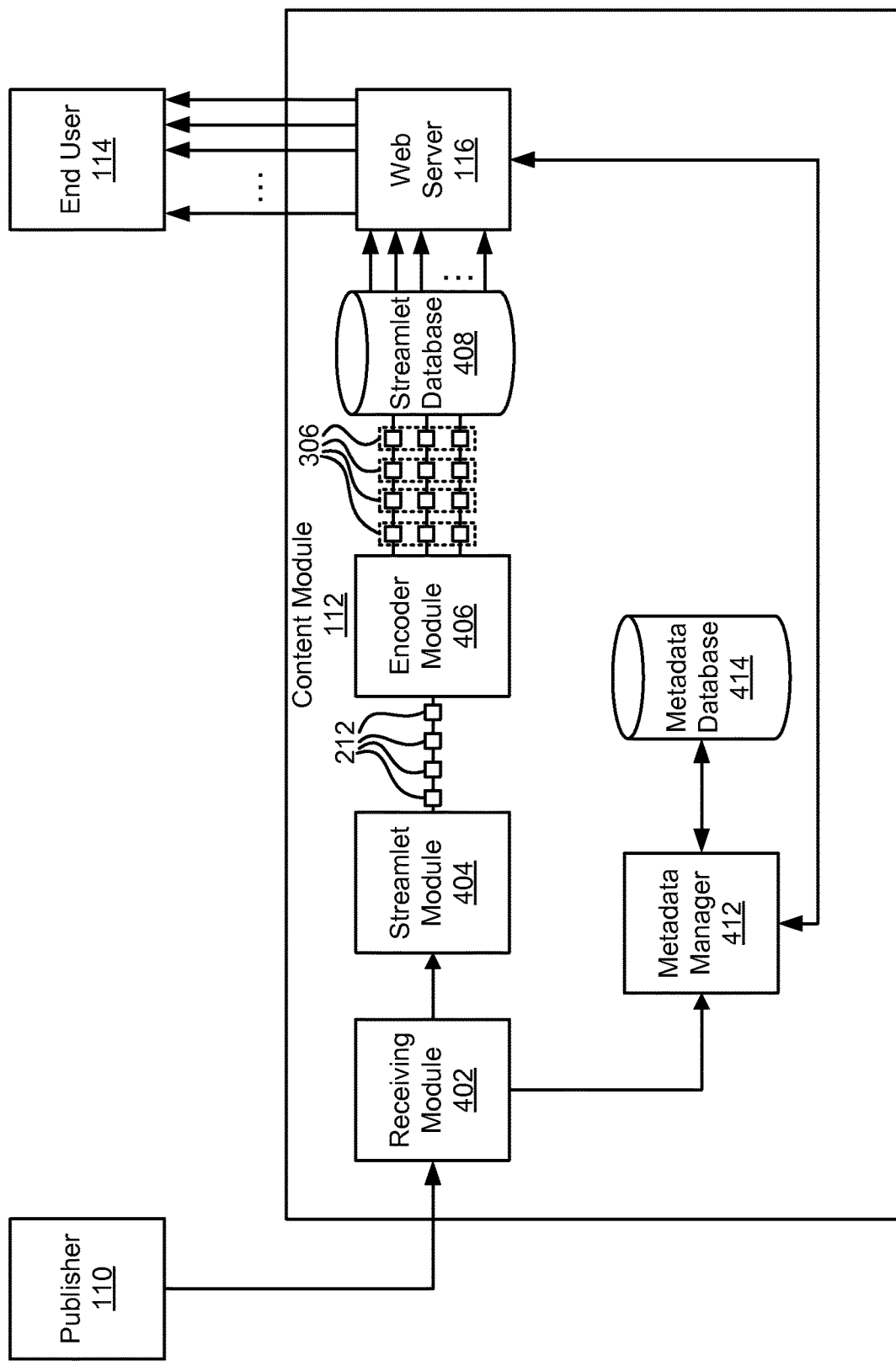
FIG. 4 is a schematic block diagram illustrating in greater detail one embodiment of the content module in accordance with the present invention.

FIG. 4 is a schematic block diagram illustrating in greater detail one embodiment of the content module 112 in accordance with the present invention. The content module 112 may comprise a capture module 402, a streamlet module 404, an encoder module 406, a streamlet database 408, and the web server 116. In one embodiment, the capture module 402 is configured to receive the content file 200 from the publisher 110. The capture module 402 may be configured to "decompress" the content file 200. For example, if the content file 200 arrives having been encoded with one of the above described encoding schemes, the capture module 402 may convert the content file 200 into raw audio and/or video. Alternatively, the content file 200 may be transmitted by the publisher in a format 110 that does not require decompression.

The capture module 402 may comprise a capture card configured for TV and/or video capture. One example of a capture card suitable for use in the present invention is the DRC-2500 by Digital Rapids of Ontario, Canada. Alternatively, any capture card capable of capturing audio and video may be utilized with the present invention. In a further embodiment, the capture module 402 is configured to pass the content file to the streamlet module 404.

The streamlet module 404, in one embodiment, is configured to segment the content file 200 and generate source streamlets 303 that are not encoded. As used herein, the term "segment" refers to an operation to generate a streamlet of the content file 200 having a duration or size equal to or less than the duration or size of the content file 200. The streamlet module 404 may be configured to segment the content file 200 into streamlets 303 each having an equal duration. Alternatively, the streamlet module 404 may be configured to segment the content file 200 into streamlets 303 having equal file sizes.

The encoding module 406 is configured to receive the source streamlets 303 and generate the plurality of streams 202 of varying qualities. The original content file 200 from the publisher may be digital in form and may comprise content having a high bit rate such as, for example, 2 mbps. The content may be transferred from the publisher 110 to the content module 112 over the Internet 106. Such transfers of data are well known in the art and do not require further discussion herein. Alternatively, the content may comprise a captured broadcast.

In a further embodiment, the encoding module 406 is configured to generate a plurality of sets 306 of streamlets 304. The sets 306, as described above with reference to FIG. 3b, may comprise streamlets having an identical time index and duration, and a unique bitrate. As with FIG. 3b, the sets 306 and subsequently the plurality of streams 202 may comprise the low quality stream 204, the medium quality stream 206, and the high quality stream 208. Alternatively, the plurality of streams 202 may comprise any number of streams deemed necessary to accommodate end user bandwidth.

The encoder module 406 is further configured to encode each source streamlet 303 into the plurality of streams 202 and streamlet sets 306 and store the streamlets in the streamlet database 408. The encoding module 406 may utilize encoding schemes such as DivX®, Windows Media Video 9®, Quicktime 6.5 Sorenson 3®, or Quicktime 6.5/MPEG-4®. Alternatively, a custom encoding scheme may be employed.

The content module 112 may also include a metadata module 412 and a metadata database 414. In one embodiment, metadata comprises static searchable content information. For example, metadata includes, but is not limited to, air date of the content, title, actresses, actors, length, and episode name. Metadata is generated by the publisher 110, and may be configured to define an end user environment. In one embodiment, the publisher 100 may define an end user navigational environment for the content including menus, thumbnails, sidebars, advertising, etc. Additionally, the publisher 110 may define functions such as fast forward, rewind, pause, and play that may be used with the content file 200. The metadata module 412 is configured to receive the metadata from the publisher 110 and store the metadata in the metadata database 414. In a further embodiment, the metadata module 412 is configured to interface with the client module 114, allowing the client module 114 to search for content based upon at least one of a plurality of metadata criteria. Additionally, metadata may be generated by the content module 112 through automated process(es) or manual definition.

Once the streamlets 304 have been received and processed, the client module 114 may request streamlets 304 using HTTP from the web server 116. Using a standard protocol such as HTTP eliminates the need for network administrators to configure firewalls to recognize and pass through network traffic for a new, specialized protocol. Additionally, since the client module 114 initiates the request, the web server 116 is only required to retrieve and serve the requested streamlet 304. In a further embodiment, the client module 114 may be configured to retrieve streamlets 304 from a plurality of web servers 116.

Each web server 116 may be located in various locations across the Internet 106. The streamlets 304 may essentially be static files. As such, no specialized media server or server-side intelligence is required for a client module 114 to retrieve streamlets 304. Streamlets 304 may be served by the web server 116 or cached by cache servers of Internet Service Providers (ISPs), or any other network infrastructure operators, and served by the cache server. Use of cache servers is well known to those skilled in the art, and will not be discussed further herein. Thus, a highly scalable solution is provided that is not hindered by massive amounts of client module 114 requests to the web server 116 at any specific location, especially the web server 116 most closely associated with or within the content module 112

Figure 5A:
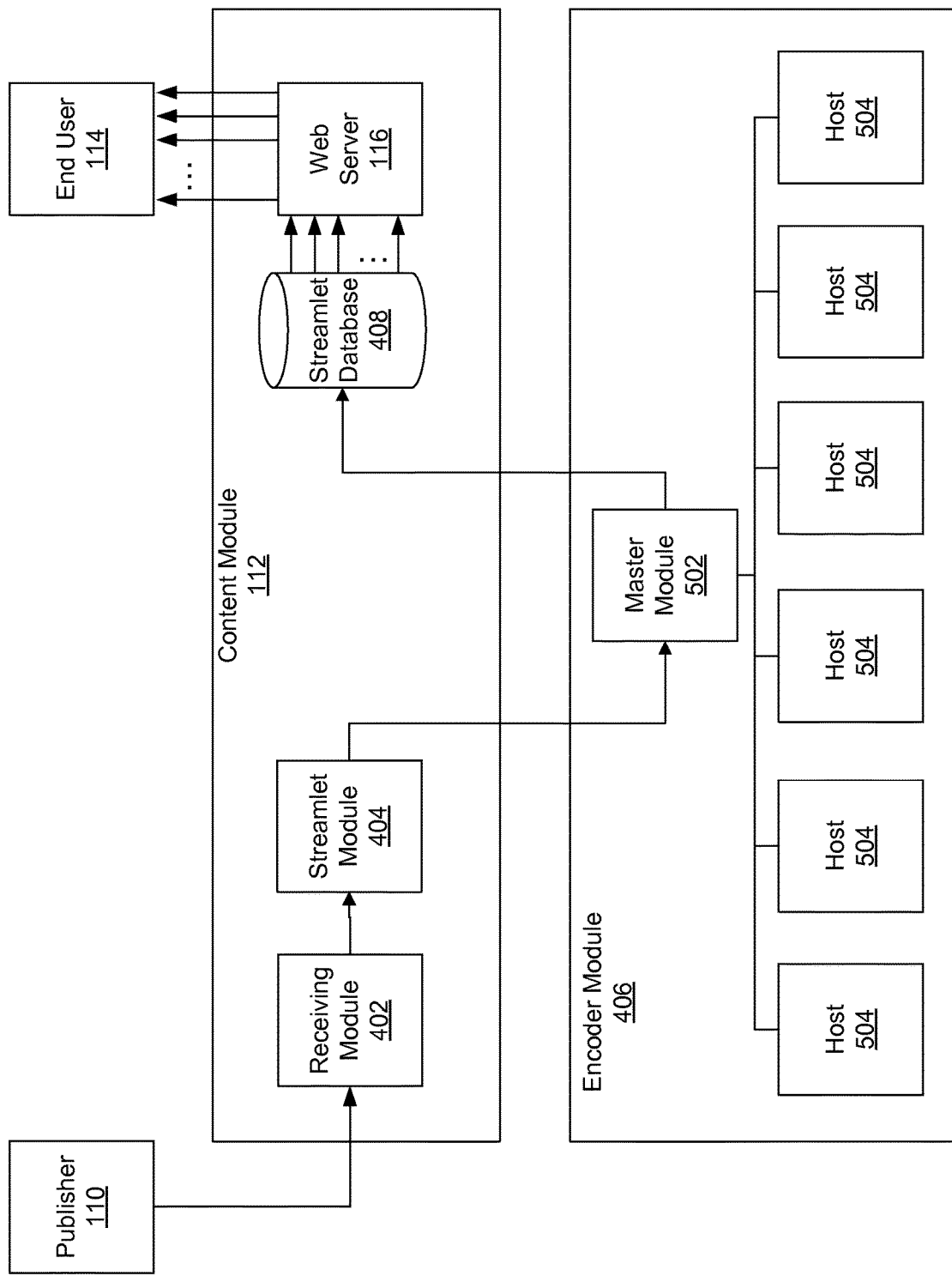
FIG. 5a is a schematic block diagram illustrating one embodiment of an encoder module in accordance with the present invention.

FIG. 5a is a schematic block diagram illustrating one embodiment of an encoder module 406 in accordance with the present invention. In one embodiment, the encoder module 406 may include a master module 502 and a plurality of host computing modules (hereinafter "host") 504. The hosts 504 may comprise personal computers, servers, etc. In a further embodiment, the hosts 504 may be dedicated hardware, for example, cards plugged into a single computer.

The master module (hereinafter "master") 502 is configured to receive streamlets 303 from the streamlet module 404 and stage the streamlet 303 for processing. In one embodiment, the master 502 may decompress each source streamlet 303 to produce a raw streamlet. As used herein, the term "raw streamlet" refers to a streamlet 303 that is uncompressed or lightly compressed to substantially reduce size with no significant loss in quality. A lightly compressed raw streamlet can be transmitted more quickly and to more hosts. Each host 504 is coupled with the master 502 and configured to receive a raw streamlet from the master 502 for encoding. The hosts 504, in one example, generate a plurality of streamlets 304 having identical time indices and durations, and varying bitrates. Essentially each host 504 may be configured to generate a set 306 from the raw streamlet 503 sent from the master 502. Alternatively, each host 504 may be dedicated to producing a single bitrate in order to reduce the time required for encoding.

Upon encoding completion, the host 504 returns the set 306 to the master 502 so that the encoding module 406 may store the set 306 in the streamlet database 408. The master 502 is further configured to assign encoding jobs to the hosts 504. Each host is configured to submit an encoding job completion bid (hereinafter "bid"). The master 502 assigns encoding jobs depending on the bids from the hosts 504. Each host 504 generates a bid depending upon a plurality of computing variables which may include, but are not limited to, current encoding job completion percentage, average job completion time, processor speed and physical memory capacity.

For example, a host 504 may submit a bid that indicates that based on past performance history the host 504 would be able to complete the encoding job in 15 seconds. The master 502 is configured to select from among a plurality of bids the best bid and subsequently submit the encoding job to the host 504 with the best bid. As such, the described encoding system does not require that each host 504 have identical hardware but beneficially takes advantage of the available computing power of the hosts 504. Alternatively, the master 502 selects the host 504 based on a first come first serve basis, or some other algorithm deemed suitable for a particular encoding job.

The time required to encode one streamlet 304 is dependent upon the computing power of the host 504, and the encoding requirements of the content file 200. Examples of encoding requirements may include, but are not limited to, two or multi-pass encoding, and multiple streams of different bitrates. One benefit of the present invention is the ability to perform two-pass encoding on a live content file 200. Typically, in order to perform two-pass encoding prior art systems must wait for the content file to be completed before encoding.

The present invention, however, segments the content file 200 into source streamlets 303 and the two-pass encoding to a plurality of streams 202 may be performed on each corresponding raw streamlet without waiting for a TV show to end, for example. As such, the content module 112 is capable of streaming the streamlets over the Internet shortly after the content module 112 begins capture of the content file 200. The delay between a live broadcast transmitted from the publisher 110 and the availability of the content depends on the computing power of the hosts 504.

Figure 5B:
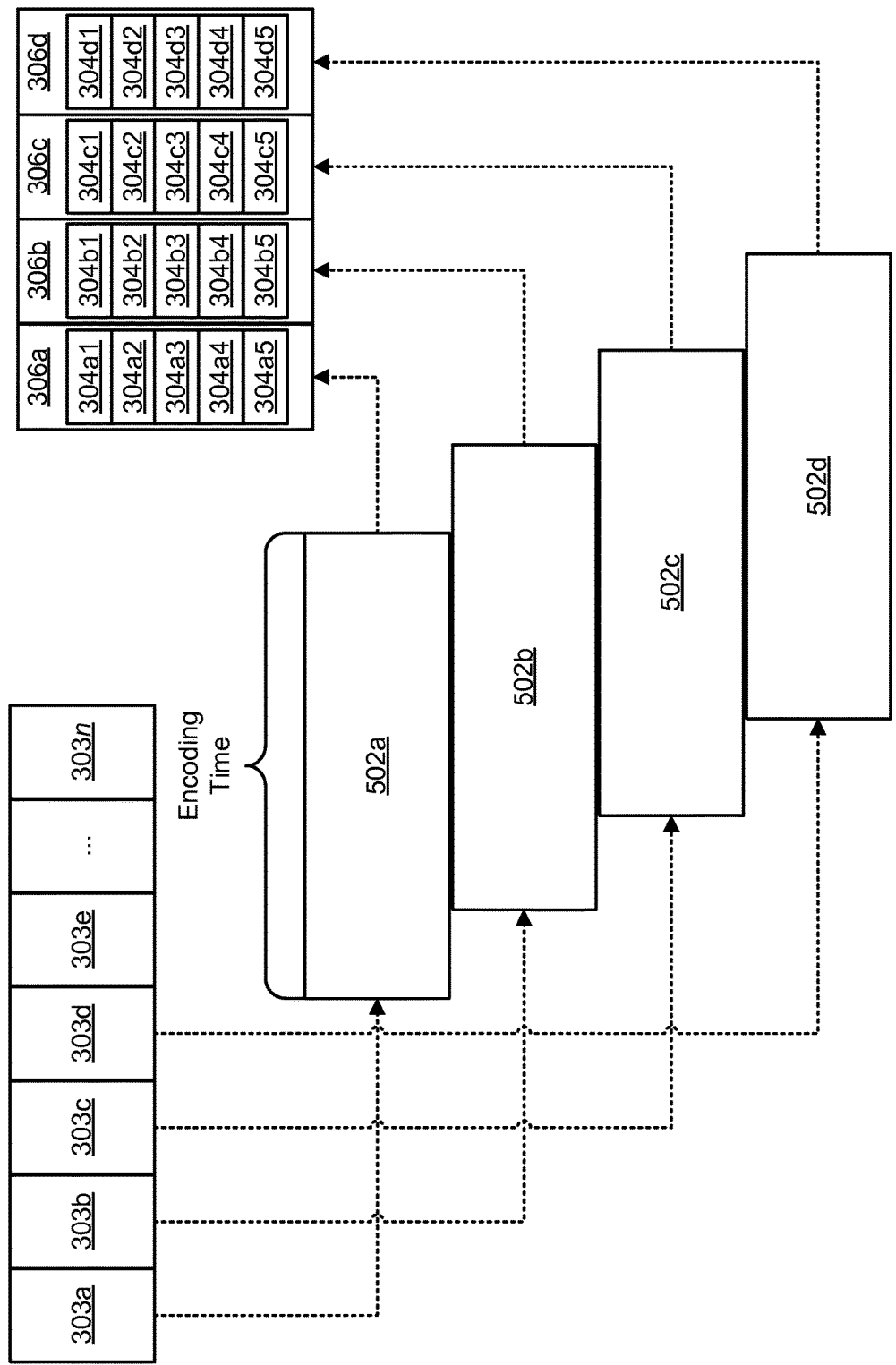
FIG. 5b is a schematic block diagram illustrating one embodiment of parallel encoding of streamlets in accordance with the present invention.

FIG. 5b is a schematic block diagram illustrating one embodiment of parallel encoding of streamlets in accordance with the present invention. In one example, the capture module 402 (of FIG. 4) begins to capture the content file and the streamlet module 404 generates a first streamlet 303a and passes the streamlet to the encoding module 406. The encoding module 406 may take 10 seconds, for example, to generate the first set 306a of streamlets 304a (304a1, 304a2, 304a3, etc. represent streamlets 304 of different bitrates). FIG. 5b illustrates the encoding process generically as block 502 to graphically illustrate the time duration required to process a raw or lightly encoded streamlet 303 as described above with reference to the encoding module 406. The encoding module 406 may simultaneously process more than one streamlet 303, and processing of streamlets will begin upon arrival of the streamlet from the capture module 402.

During the 10 seconds required to encode the first streamlet 303a, the streamlet module 404 has generated five additional 2-second streamlets 303b, 303c, 303d, 303e, 303f, for encoding and the master 502 has prepared and staged the corresponding raw streamlets. Two seconds after the first set 306a is available the next set 306b is available, and so on. As such, the content file 200 is encoded for streaming over the Internet and appears live. The 10 second delay is given herein by way of example only. Multiple hosts 504 may be added to the encoding module 406 in order to increase the processing capacity of the encoding module 406. The delay may be shortened to an almost unperceivable level by the addition of high CPU powered systems, or alternatively multiple low powered systems.

A system as described above beneficially enables multi-pass encoding of live events. Multi-pass encoding systems of the prior art require that the entire content be captured (or be complete) because in order to perform multi-pass encoding the entire content must be scanned and processed more than once. This is impossible with prior art systems because content from a live event is not complete until the event is over. As such, with prior art systems, multi-pass encoding can only be performed once the event is over. Streamlets, however, may be encoded as many times as is deemed necessary. Because the streamlet is an encapsulated media object of 2 seconds (for example), multi-pass encoding may begin on a live event once the first streamlet is captured. Shortly after multi-pass encoding of the first streamlet 303a is finished, multi-pass encoding of the second streamlet 303b finishes, and as such multi-pass encoding is performed on a live event and appears live to a viewer.

Any specific encoding scheme applied to a streamlet may take longer to complete than the time duration of the streamlet itself, for example, a very high quality encoding of a 2-second streamlet may take 5 seconds to finish. Alternatively, the processing time required for each streamlet may be less than the time duration of a streamlet. However, because the offset parallel encoding of successive streamlets are encoded by the encoding module at regular intervals (matching the intervals at which the those streamlets are submitted to the encoding module 406, for example 2 seconds) the output timing of the encoding module 406 does not fall behind the real-time submission rate of the unencoded streamlets. Conversely, prior art encoding systems rely on the very fastest computing hardware and software because the systems must generate the output immediately in lock-step with the input. A prior art system that takes 2.1 seconds to encode 2 seconds worth of content is considered a failure. The present invention allows for slower than real-time encoding processes yet still achieves a real-time encoding effect due to the parallel offset pipes.

The parallel offset pipeline approach described with reference to FIG. 5b beneficially allows for long or short encoding times without "falling behind" the live event. Additionally, arbitrarily complex encoding of streamlets to multiple profiles and optimizations only lengthens the encoding time 502 without a perceptible difference to a user because the sets 306 of streamlets 304 are encoded in a time-selective manner so that streamlets are processed at regular time intervals and transmitted at these time intervals.

Returning now to FIG. 5a, as depicted, the master 502 and the hosts 504 may be located within a single local area network, or in other terms, the hosts 504 may be in close physical proximity to the master 502. Alternatively, the hosts 504 may receive encoding jobs from the master 502 over the Internet or other communications network. For example, consider a live sports event in a remote location where it would be difficult to setup multiple hosts. In this example, a master performs no encoding or alternatively light encoding before publishing the streamlets online. The hosts 504 would then retrieve those streamlets and encode the streamlets into the multiple bitrate sets 306 as described above.

Furthermore, hosts 504 may be dynamically added or removed from the encoding module without restarting the encoding job and/or interrupting the publishing of streamlets. If a host 504 experiences a crash or some failure, its encoding work is simply reassigned to another host.

The encoding module 406, in one embodiment, may also be configured to produce streamlets that are specific to a particular playback platform. For example, for a single raw streamlet, a single host 504 may produce streamlets for different quality levels for personal computer playback, streamlets for playback on cell phones with a different, proprietary codec, a small video-only streamlet for use when playing just a thumbnail view of the stream (like in a programming guide), and a very high quality streamlet for use in archiving.

Figure 6A:
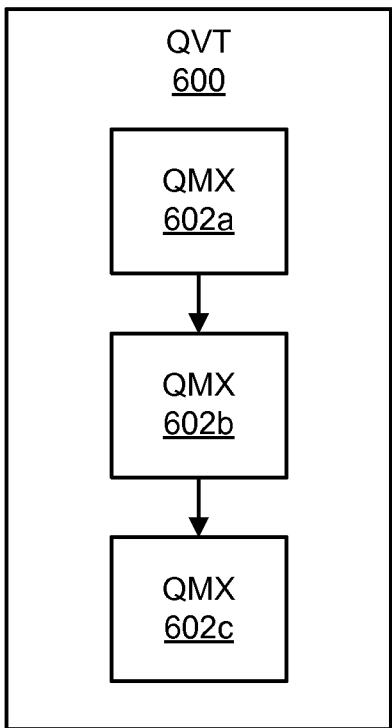
FIG. 6a is a schematic block diagram illustrating one embodiment of a virtual timeline in accordance with the present invention.

FIG. 6a is a schematic block diagram illustrating one embodiment of a virtual timeline 600 in accordance with the present invention. In one embodiment, the virtual timeline 600 comprises at least one quantum media extension 602. The quantum media extension (hereinafter "QMX") 602 describes an entire content file 200. Therefore, the virtual timeline (hereinafter "VT") 600 may comprise a file that is configured to define a playlist for a user to view. For example, the VT may indicate that the publisher desires a user to watch a first show QMX 602a followed by QMX 602b and QMX 602c. As such, the publisher may define a broadcast schedule in a manner similar to a television station.

Figure 6B:
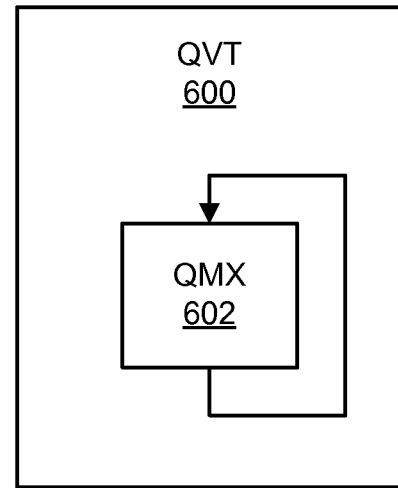
FIG. 6b is a schematic block diagram illustrating an alternative embodiment of a VT in accordance with the present invention.

FIG. 6b is a schematic block diagram illustrating an alternative embodiment of a VT 600 in accordance with the present invention. In the depicted embodiment, the VT 600 may include a single QMX 602 which indicates that the publisher desires the same content to be looped over and over again. For example, the publisher may wish to broadcast a never-ending infomercial on a website.

Figure 6C:
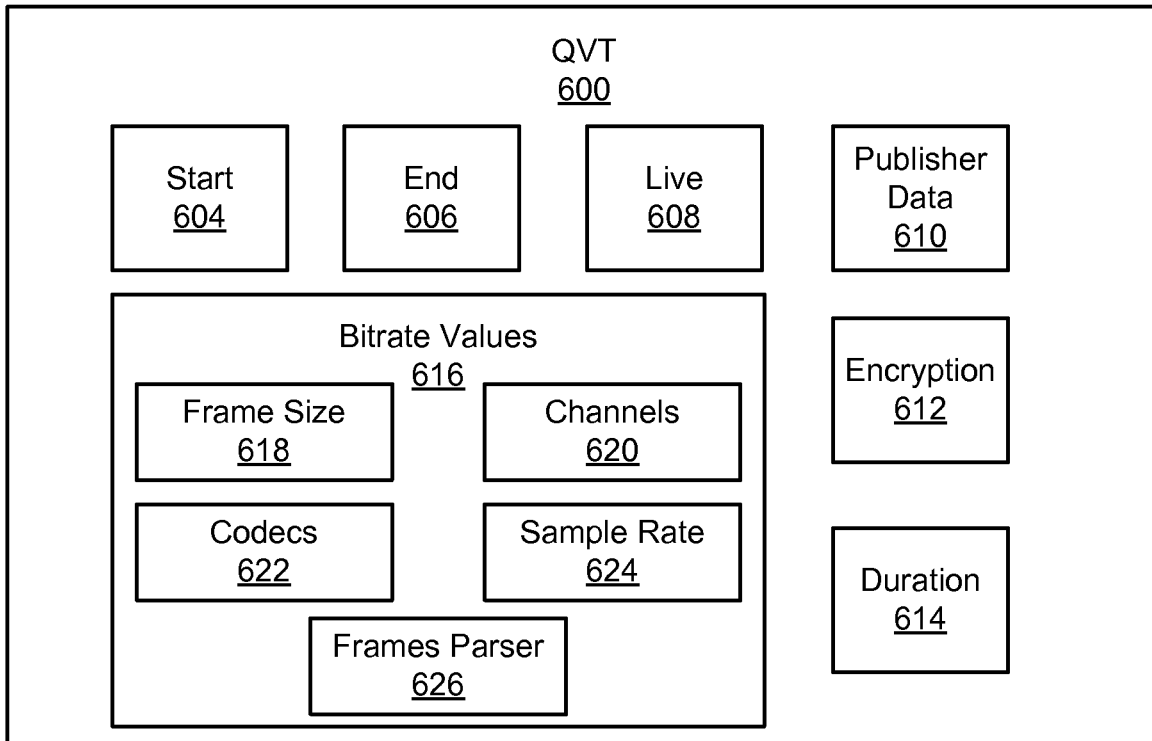
FIG. 6c is a schematic block diagram illustrating one embodiment of a QMX in accordance with the present invention.

FIG. 6c is a schematic block diagram illustrating one embodiment of a QMX 602 in accordance with the present invention. In one embodiment, the QMX 602 contains a multitude of information generated by the content module 112 configured to describe the content file 200. Examples of information include, but are not limited to, start index 604, end index 606, whether the content is live 608, proprietary publisher data 610, encryption level 612, content duration 614 and bitrate values 616. The bitrate values 616 may include frame size 618, audio channel 620 information, codecs 622 used, sample rate 624, and frames parser 626.

A publisher may utilize the QVT 600 together with the QMX 602 in order to prescribe a playback order for users, or alternatively selectively edit content. For example, a publisher may indicate in the QMX 602 that audio should be muted at time index 10:42 or video should be skipped for 3 seconds at time index 18:35. As such, the publisher may selectively skip offensive content without the processing requirements of editing the content.

Figure 7:
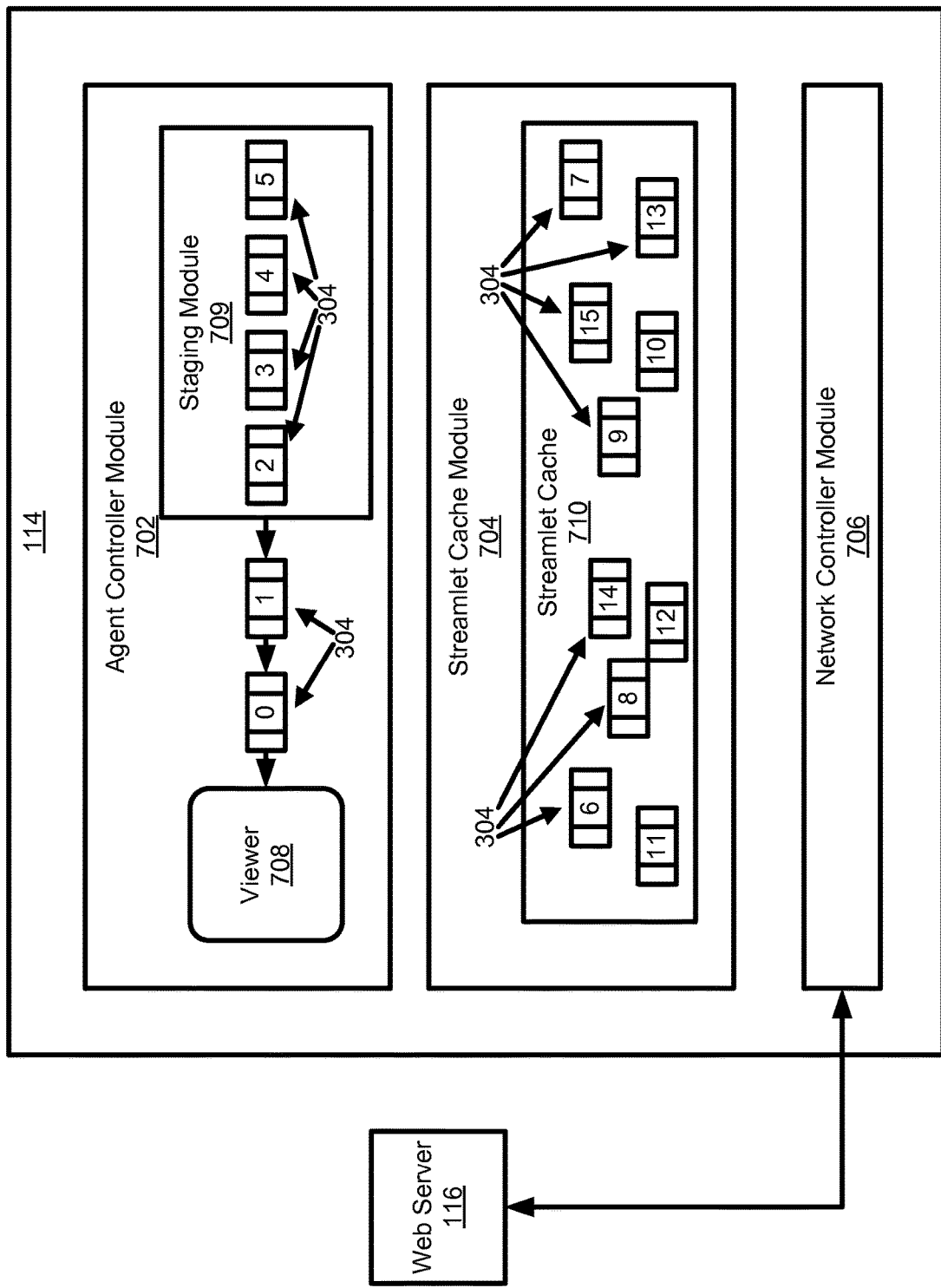
FIG. 7 is a schematic block diagram graphically illustrating one embodiment of a client module in accordance with the present invention.

FIG. 7 is a schematic block diagram graphically illustrating one embodiment of a client module 114 in accordance with the present invention. The client module 114 may comprise an agent controller module 702, a streamlet cache module 704, and a network controller module 706. In one embodiment, the agent controller module 702 is configured to interface with a viewer 708, and transmit streamlets 304 to the viewer 708. Alternatively, the agent controller module 702 may be configured to simply reassemble streamlets into a single file for transfer to an external device such as a portable video player.

In a further embodiment, the client module 114 may comprise a plurality of agent controller modules 702. Each agent controller module 702 may be configured to interface with one viewer 708. Alternatively, the agent controller module 702 may be configured to interface with a plurality of viewers 708. The viewer 708 may be a media player (not shown) operating on a PC or handheld electronic device.

The agent controller module 702 is configured to select a quality level of streamlets to transmit to the viewer 708. The agent controller module 702 requests lower or higher quality streams based upon continuous observation of time intervals between successive receive times of each requested streamlet. The method of requesting higher or lower quality streams will be discussed in greater detail below with reference to FIG. 10.

The agent controller module 702 may be configured to receive user commands from the viewer 708. Such commands may include play, fast forward, rewind, pause, and stop. In one embodiment, the agent controller module 702 requests streamlets 304 from the streamlet cache module 704 and arranges the received streamlets 304 in a staging module 709. The staging module 709 may be configured to arrange the streamlets 304 in order of ascending playback time. In the depicted embodiment, the streamlets 304 are numbered 0, 1, 2, 3, 4, etc. However, each streamlet 304 may be identified with a unique filename.

Additionally, the agent controller module 702 may be configured to anticipate streamlet 304 requests and pre-request streamlets 304. By pre-requesting streamlets 304, the user may fast-forward, skip randomly, or rewind through the content and experience no buffering delay. In a further embodiment, the agent controller module 702 may request the streamlets 304 that correspond to time index intervals of 30 seconds within the total play time of the content. Alternatively, the agent controller module 702 may request streamlets at any interval less than the length of the time index. This enables a "fast-start" capability with no buffering wait when starting or fast-forwarding through content file 200. In a further embodiment, the agent controller module 702 may be configured to pre-request streamlets 304 corresponding to specified index points within the content or within other content in anticipation of the end user 104 selecting new content to view. In one embodiment, the streamlet cache module 704 is configured to receive streamlet 304 requests from the agent controller module 702. Upon receiving a request, the streamlet cache module 704 first checks a streamlet cache 710 to verify if the streamlet 304 is present. In a further embodiment, the streamlet cache module 704 handles streamlet 304 requests from a plurality of agent controller modules 702. Alternatively, a streamlet cache module 704 may be provided for each agent controller module 702. If the requested streamlet 304 is not present in the streamlet cache 410, the request is passed to the network controller module 706. In order to enable fast forward and rewind capabilities, the streamlet cache module 704 is configured to store the plurality of streamlets 304 in the streamlet cache 710 for a specified time period after the streamlet 304 has been viewed. However, once the streamlets 304 have been deleted, they may be requested again from the web server 116.

The network controller module 706 may be configured to receive streamlet requests from the streamlet cache module 704 and open a connection to the web server 116 or other remote streamlet 304 database (not shown). In one embodiment, the network controller module 706 opens a TCP/IP connection to the web server 116 and generates a standard HTTP GET request for the requested streamlet 304. Upon receiving the requested streamlet 304, the network controller module 706 passes the streamlet 304 to the streamlet cache module 704 where it is stored in the streamlet cache 710. In a further embodiment, the network controller module 706 is configured to process and request a plurality of streamlets 304 simultaneously. The network controller module 706 may also be configured to request a plurality of streamlets, where each streamlet 304 is subsequently requested in multiple parts.

In a further embodiment, streamlet requests may comprise requesting pieces of any streamlet file. Splitting the streamlet 304 into smaller pieces or portions beneficially allows for an increased efficiency potential, and also eliminates problems associated with multiple full-streamlet requests sharing the bandwidth at any given moment. This is achieved by using parallel TCP/IP connections for pieces of the streamlets 304. Consequently, efficiency and network loss problems are overcome, and the streamlets arrive with more useful and predictable timing.

In one embodiment, the client module 114 is configured to use multiple TCP connections between the client module 114 and the web server 116 or web cache. The intervention of a cache may be transparent to the client or configured by the client as a forward cache. By requesting more than one streamlet 304 at a time in a manner referred to as "parallel retrieval," or more than one part of a streamlet 304 at a time, efficiency is raised significantly and latency is virtually eliminated. In a further embodiment, the client module allows a maximum of three outstanding streamlet 304 requests. The client module 114 may maintain additional open TCP connections as spares to be available should another connection fail. Streamlet 304 requests are rotated among all open connections to keep the TCP flow logic for any particular connection from falling into a slow-start or close mode. If the network controller module 706 has requested a streamlet 304 in multiple parts, with each part requested on mutually independent TCP/IP connections, the network controller module 706 reassembles the parts to present a complete streamlet 304 for use by all other components of the client module 114.

When a TCP connection fails completely, a new request may be sent on a different connection for the same streamlet 304. In a further embodiment, if a request is not being satisfied in a timely manner, a redundant request may be sent on a different connection for the same streamlet 304. If the first streamlet request's response arrives before the redundant request response, the redundant request can be aborted. If the redundant request response arrives before the first request response, the first request may be aborted.

Several streamlet 304 requests may be sent on a single TCP connection, and the responses are caused to flow back in matching order along the same connection. This eliminates all but the first request latency. Because multiple responses are always being transmitted, the processing latency of each new streamlet 304 response after the first is not a factor in performance. This technique is known in the industry as "pipelining." Pipelining offers efficiency in request-response processing by eliminating most of the effects of request latency. However, pipelining has serious vulnerabilities. Transmission delays affect all of the responses. If the single TCP connection fails, all of the outstanding requests and responses are lost. Pipelining causes a serial dependency between the requests.

Multiple TCP connections may be opened between the client module 114 and the web server 116 to achieve the latency-reduction efficiency benefits of pipelining while maintaining the independence of each streamlet 304 request. Several streamlet 304 requests may be sent concurrently, with each request being sent on a mutually distinct TCP connection. This technique is labeled "virtual pipelining" and is an innovation of the present invention. Multiple responses may be in transit concurrently, assuring that communication bandwidth between the client module 114 and the web server 116 is always being utilized. Virtual pipelining eliminates the vulnerabilities of traditional pipelining. A delay in or complete failure of one response does not affect the transmission of other responses because each response occupies an independent TCP connection. Any transmission bandwidth not in use by one of multiple responses (whether due to delays or TCP connection failure) may be utilized by other outstanding responses.

A single streamlet 304 request may be issued for an entire streamlet 304, or multiple requests may be issued, each for a different part or portion of the streamlet. If the streamlet is requested in several parts, the parts may be recombined by the client module 114 streamlet.

In order to maintain a proper balance between maximized bandwidth utilization and response time, the issuance of new streamlet requests must be timed such that the web server 116 does not transmit the response before the client module 114 has fully received a response to one of the previously outstanding streamlet requests. For example, if three streamlet 304 requests are outstanding, the client module 114 should issue the next request slightly before one of the three responses is fully received and "out of the pipe." In other words, request timing is adjusted to keep three responses in transit. Sharing of bandwidth among four responses diminishes the net response time of the other three responses. The timing adjustment may be calculated dynamically by observation, and the request timing adjusted accordingly to maintain the proper balance of efficiency and response times.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
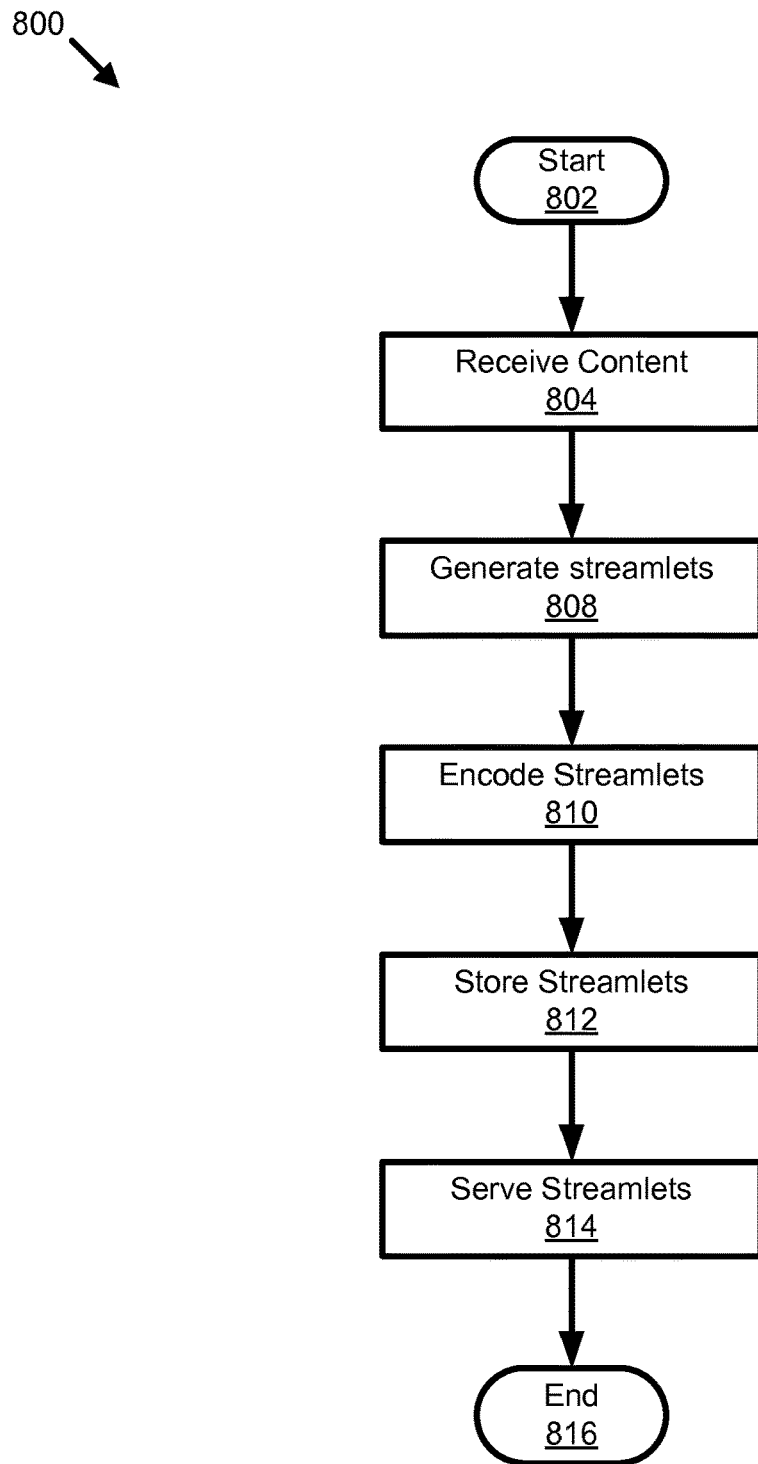
FIG. 8 is a schematic flow chart diagram illustrating one embodiment of a method for processing content in accordance with the present invention.

FIG. 8 is a schematic flow chart diagram illustrating one embodiment of a method 800 for processing content in accordance with the present invention. In one embodiment the method 800 starts 802, and the content module 112 receives 804 content from the publisher 110. Receiving content 804 may comprise receiving 804 a digital copy of the content file 200, or digitizing a physical copy of the content file 200. Alternatively, receiving 804 content may comprise capturing a radio, television, cable, or satellite broadcast. Once received 804, the streamlet module 404 generates 808 a plurality of source streamlets 303 each having a fixed duration. Alternatively, the streamlets 303 may be generated with a fixed file size.

In one embodiment, generating 808 streamlets comprises dividing the content file 200 into a plurality of two second streamlets 303. Alternatively, the streamlets may have any length less than or equal to the length of the stream 202. The encoder module 406 then encodes 810 the streamlets 303 into sets 306 of streamlets 304, in a plurality of streams 202 according to an encoding scheme. The quality may be predefined, or automatically set according to end user bandwidth, or in response to pre-designated publisher guidelines In a further embodiment, the encoding scheme comprises a proprietary codec such as WMV9®. The encoder module 406 then stores 812 the encoded streamlets 304 in the streamlet database 408. Once stored 812, the web server 116 may then serve 814 the streamlets 304. In one embodiment, serving 814 the streamlets 304 comprises receiving streamlet requests from the client module 114, retrieving the requested streamlet 304 from the streamlet database 408, and subsequently transmitting the streamlet 304 to the client module 114. The method 800 then ends 816.

Figure 9:
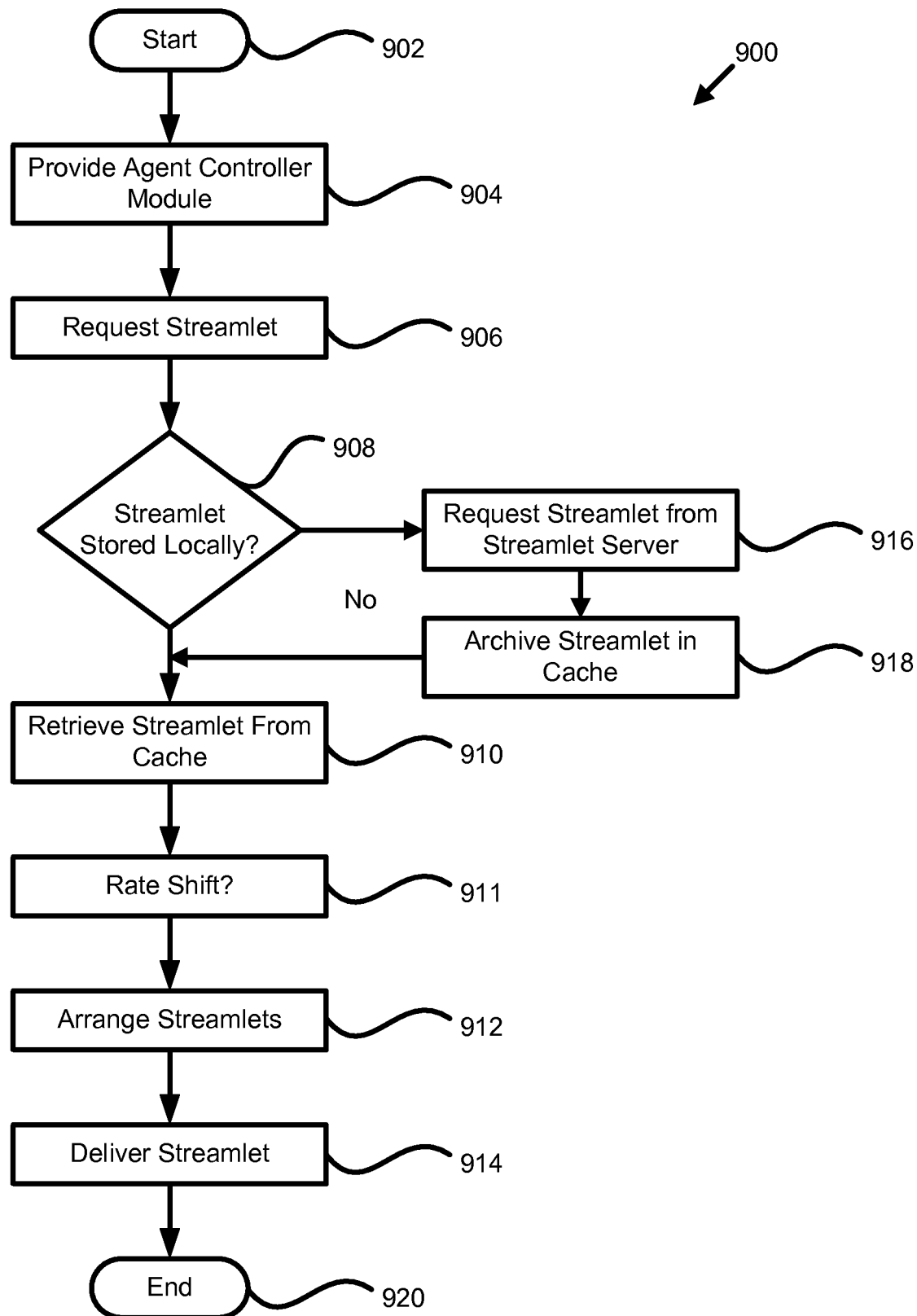
FIG. 9 is a schematic flow chart diagram illustrating one embodiment of a method for viewing a plurality of streamlets in accordance with the present invention.

FIG. 9 is a schematic flow chart diagram illustrating one embodiment of a method 900 for viewing a plurality of streamlets in accordance with the present invention. The method 900 starts and an agent controller module 702 is provided 904 and associated with a viewer 708 and provided with a staging module 709. The agent controller module 702 then requests 906 a streamlet 304 from the streamlet cache module 704. Alternatively, the agent controller module 702 may simultaneously request 906 a plurality of streamlets 304 the streamlet cache module 704. If the streamlet is stored 908 locally in the streamlet cache 710, the streamlet cache module 704 retrieves 910 the streamlet 304 and sends the streamlet to the agent controller module 702. Upon retrieving 910 or receiving a streamlet, the agent controller module 702 makes 911 a determination of whether or not to shift to a higher or lower quality stream 202. This determination will be described below in greater detail with reference to FIG. 10.

In one embodiment, the staging module 709 then arranges 912 the streamlets 304 into the proper order, and the agent controller module 702 delivers 914 the streamlets to the viewer 708. In a further embodiment, delivering 914 streamlets 304 to the end user comprises playing video and or audio streamlets on the viewer 708. If the streamlets 304 are not stored 908 locally, the streamlet request is passed to the network controller module 706. The network controller module 706 then requests 916 the streamlet 304 from the web server 116. Once the streamlet 304 is received, the network controller module 706 passes the streamlet to the streamlet cache module 704. The streamlet cache module 704 archives 918 the streamlet. Alternatively, the streamlet cache module 704 then archives 918 the streamlet and passes the streamlet to the agent controller module 702, and the method 900 then continues from operation 910 as described above.

Figure 10:
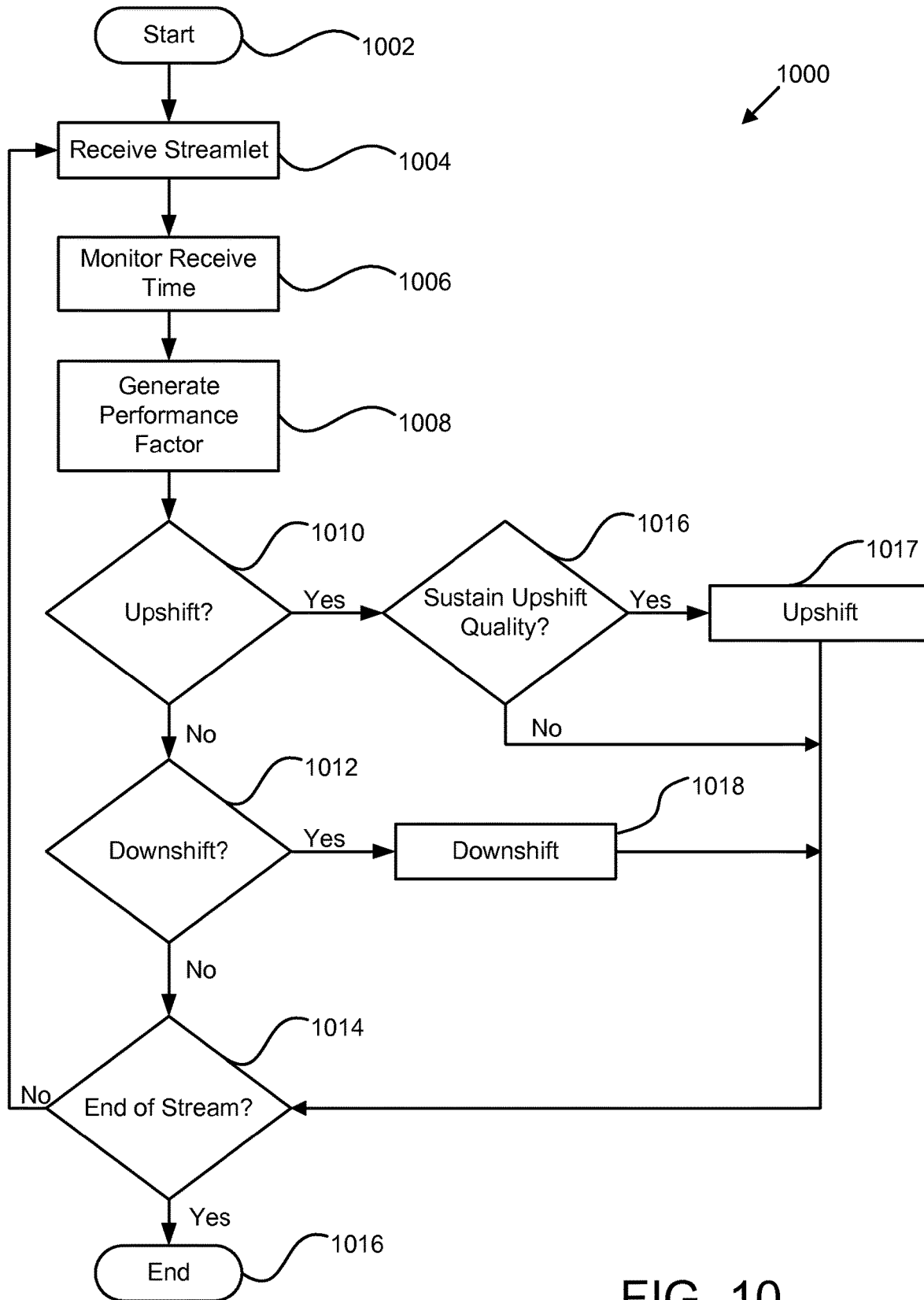
FIG. 10 is a schematic flow chart diagram illustrating one embodiment of a method for requesting streamlets within an adaptive-rate shifting content streaming environment in accordance with the present invention.

Referring now to FIG. 10, shown therein is a schematic flow chart diagram illustrating one embodiment of a method 1000 for requesting streamlets 304 within an adaptive-rate shifting content streaming environment in accordance with the present invention. The method 1000 may be used in one embodiment as the operation 911 of FIG. 9. The method 1000 starts and the agent controller module 702 receives 1004 a streamlet 304 as described above with reference to FIG. 9. The agent controller module 702 then monitors 1006 the receive time of the requested streamlet. In one embodiment, the agent controller module 702 monitors the time intervals A between successive receive times for each streamlet response. Ordering of the responses in relation to the order of their corresponding requests is not relevant.

Because network behavioral characteristics fluctuate, sometimes quite suddenly, any given Δ may vary substantially from another. In order to compensate for this fluctuation, the agent controller module 702 calculates 1008 a performance ratio r across a window of n samples for streamlets of playback length S. In one embodiment, the performance ratio r is calculated using the equation:

$$r = S \frac{n}{\sum_{i=1}^{n} \Delta_i}$$

Due to multiple simultaneous streamlet processing, and in order to better judge the central tendency of the performance ratio r, the agent controller module 702 may calculate a geometric mean, or alternatively an equivalent averaging algorithm, across a window of size m, and obtain a performance factor φ:

$$\varphi_{current} = \left( \prod_{j=1}^{m} r_j \right)^{\frac{1}{m}}$$

The policy determination about whether or not to upshift 1010 playback quality begins by comparing $\varphi_{current}$ with a trigger threshold $\Theta_{up}$. If $\varphi_{current} \geq \Theta_{up}$, then an up shift to the next higher quality stream may be considered 1016. In one embodiment, the trigger threshold $\Theta_{up}$ is determined by a combination of factors relating to the current read ahead margin (i.e. the amount of contiguously available streamlets that have been sequentially arranged by the staging module 709 for presentation at the current playback time index), and a minimum safety margin. In one embodiment, the minimum safety margin may be 24 seconds. The smaller the read ahead margin, the larger $\Theta_{up}$ is to discourage upshifting until a larger read ahead margin may be established to withstand network disruptions. If the agent controller module 702 is able to sustain 1016 upshift quality, then the agent controller module 702 will upshift 1017 the quality and subsequently request higher quality streams. The determination of whether use of the higher quality stream is sustainable 1016 is made by comparing an estimate of the higher quality stream's performance factor, $\varphi_{higher}$, with $\Theta_{up}$. If $\varphi_{higher} \geq \Theta_{up}$ then use of the higher quality stream is considered sustainable. If the decision of whether or not the higher stream rate is sustainable 1016 is "no," the agent controller module 702 will not attempt to upshift 1017 stream quality. If the end of the stream has been reached 1014, the method 1000 ends 1016.

If the decision on whether or not to attempt upshift 1010 is "no", a decision about whether or not to downshift 1012 is made. In one embodiment, a trigger threshold $\Theta_{down}$ is defined in a manner analogous to $\Theta_{up}$. If $\varphi_{current} > \Theta_{down}$ then the stream quality may be adequate, and the agent controller module 702 does not downshift 1018 stream quality. However, if $\varphi_{current} \leq \Theta_{down}$, the agent controller module 702 does downshift 1018 the stream quality. If the end of the stream has not been reached 1014, the agent controller module 702 begins to request and receive 1004 lower quality streamlets and the method 1000 starts again. Of course, the above described equations and algorithms are illustrative only, and may be replaced by alternative streamlet monitoring solutions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for adaptive-rate content streaming of a video that is playable on one or more end user stations over the internet, the system comprising:
   at least one storage device storing the video, wherein the video is digitally encoded at a plurality of different bitrates creating a plurality of streams including a low quality stream, a medium quality stream, and a high quality stream, the low quality stream, the medium quality stream, and the high quality stream each comprising a group of streamlets, wherein each streamlet corresponds to a portion of the video, and wherein each streamlet in each group of streamlets is encoded at a respective one of the plurality of different bitrates, and wherein each group of streamlets comprises at least first and second streamlets;
   wherein at least one of the low quality stream, the medium quality stream, and the high quality stream is encoded at a bitrate of no less than 600 kbps; and
   wherein the first streamlet of each of the groups of streamlets has the same first duration and encodes the same first portion of the video in each of the low quality stream, the medium quality stream, and the high quality stream, and wherein the first streamlet of the low quality stream encodes the same first portion of the video at a lower bitrate than the first streamlet of the high quality stream and the first streamlet of the medium quality stream.

2. The system of claim 1, wherein the video is a live event video.

3. The system of claim 1, wherein the video includes archived content.

4. The system of claim 1, wherein the second streamlet of each of the groups of streamlets each has the same second duration and corresponds to the same second portion of the video in the low quality stream, the medium quality stream, and the high quality stream, the second streamlet of the low quality stream having the same bitrate as the first streamlet of the low quality stream.

5. The system of claim 4, wherein the first and second durations are different.

6. The system of claim 1, further comprising: a plurality of web servers located at different locations across the internet, each web server configured to: receive at least one streamlet request over one or more internet connections from a respective one of the one or more end user stations to retrieve the first streamlet, wherein the at least one streamlet request from the respective one of the one or more end user stations includes a request for a currently selected first streamlet from one of the low quality stream, the medium quality stream, and the high quality stream based upon a determination by the respective one of the one or more end user stations to select a higher or lower bitrate version of a respective one of the plurality of streams; retrieve from the at least one storage device the requested first streamlet from the currently selected one of the low quality stream, the medium quality stream, and the high quality stream; and send the retrieved first streamlet to the respective one of the one or more end user stations over the one or more internet connections.

7. The system of claim 1, wherein each of the first streamlets has a first duration that is the range of 0.1 to 5 seconds.

8. The system of claim 1, further comprising:
a first web server configured to: receive at least one streamlet request over one or more internet connections from the one or more end user stations to retrieve the first streamlet storing the first portion of the video,
wherein the at least one streamlet request from the one or more end user stations includes a request for a currently selected first streamlet from one of the low quality stream, the medium quality stream, and the high quality stream based upon a determination by the end user station to select a higher or lower bitrate version of the video; retrieve from the storage device the requested first streamlet from the currently selected one of the low quality stream, the medium quality stream, and the high quality stream; and send the retrieved first streamlet from the currently selected one of the low quality stream, the medium quality stream, and the high quality stream to the requesting one of the end user stations over the one or more network connections.

9. The system of claim 8, wherein the first web server is further configured to: receive at least one virtual timeline request over the one or more internet connections from the one or more end user stations to retrieve a virtual timeline; and send the virtual timeline to the requesting one of the end user stations over the one or more network connections.

10. The system of claim 9, wherein the virtual timeline corresponds to the currently selected one of the low quality stream, the medium quality stream, and the high quality stream.

11. The system of claim 10, wherein the virtual timeline defines a playlist for a user to view.

12. The system of claim 11, wherein the virtual timeline comprises a file that is configured to define a playlist for a user to view.

13. The system of claim 12, wherein the virtual timeline comprises at least one quantum media extension (QMX).

14. An end user station to stream a video over a network from a server for playback of the video, the end user station comprising:
a processor;
a digital processing apparatus memory device comprising non-transitory machine-readable instructions that, when executed, cause the processor to:
establish an internet connection between the end user station and the server, wherein the server is configured to access at least one of a plurality of groups of streamlets;
wherein the video is encoded at a plurality of different bitrates to create a plurality of streams including at least a low quality stream, a medium quality stream, and a high quality stream, each of the low quality stream, the medium quality stream, and the high quality stream comprising a group of streamlets encoded at the same respective one of the different bitrates, each group comprising at least first and second streamlets, each of the streamlets corresponding to a portion of the video;
wherein at least one of the low quality stream, the medium quality stream, and the high quality stream is encoded at a bitrate of no less than 600 kbps; and wherein the first streamlets of each of the low quality stream, the medium quality stream and the high quality stream each has an equal playback duration and each of the first streamlets encodes the same portion of the video at a different one of the different bitrates;
select a specific one of the low quality stream, the medium quality stream, and the high quality stream based upon a determination by the end user station to select a higher or lower bitrate version of the streams;
place a streamlet request to the server over the internet connection for the first streamlet of the selected stream;
receive the requested first streamlet from the server via the internet connection; and
provide the received first streamlet for playback of the video.

15. The end user station of claim 14, wherein the second streamlet of each of the groups of streamlets each has the same second duration and corresponds to the same second portion of the video in the low quality stream, the medium quality stream, and the high quality stream, the second streamlet of the low quality stream having the same bitrate as the first streamlet of the low quality stream.

16. The end user station of claim 15, wherein the first and second durations are different.

17. The end user station of claim 14, wherein each of the first streamlets has a first duration that is in the range of 0.1 to 5 seconds.

18. The end user station of claim 14, wherein the end user station is further configured to: request and receive a virtual timeline; and wherein one or more streamlet requests are based on the received virtual timeline.

19. The end user station of claim 18, wherein the virtual timeline corresponds to the currently selected one of the low quality stream, the medium quality stream, and the high quality stream.

20. The end user station of claim 18, wherein the virtual timeline defines a playlist for a user to view.

21. The end user station of claim 14, wherein the video is a live event video.

22. The end user station of claim 14, wherein the video includes archived content.

23. A process executable by one or more servers to stream a video for playback by one or more end user stations, the process comprising:
storing, by the one or more servers, a plurality of streams including a low quality stream, a medium quality stream, and a high quality stream, wherein the low quality stream, the medium quality stream, and the high quality stream each comprise a group of streamlets encoded at a respective one of a plurality of different bitrates, each group comprising at least first and second streamlets, each of the streamlets corresponding to a portion of the video;

wherein at least one of the low quality stream, the medium quality stream, and the high quality stream is encoded at a bitrate of no less than 600 kbps; and wherein the first streamlet of each of the groups of streamlets has the same first duration and encodes the same first portion of the video in the low quality stream, the medium quality stream, and the high quality stream, the first streamlet of the low quality stream having a different one of the different bitrates than the first streamlet of the high quality stream and the first streamlet of the medium quality stream;

receiving at least one streamlet request over an internet connection from a respective one of the one or more end user stations to retrieve the first streamlet storing the first portion of the video, wherein the at least one streamlet request from the respective one of the one or more end user stations includes a request for a currently selected first streamlet from one of the low quality stream, the medium quality stream, and the high quality stream based upon a determination by the respective one of the one or more end user stations to select a higher or lower bitrate version of the video;

retrieving from the one or more servers the requested first streamlet from the currently selected one of the low quality stream, the medium quality stream, and the high quality stream; and sending the retrieved first streamlet from the currently selected one of the low quality stream, the medium quality stream, and the high quality stream to the respective one of the one of the end user stations over the internet connection.

24. The process of claim 23, wherein the second streamlet of each of the groups of streamlets each has the same second duration and corresponds to the same second portion of the video in the low quality stream, the medium quality stream, and the high quality stream, the second streamlet of the low quality stream having the same bitrate as the first streamlet of the low quality stream.

25. The process of claim 23, wherein the first and second durations are different.

26. The process of claim 23, wherein the video is a live event video.

27. The process of claim 23, wherein the video includes archived content.

28. A process executable by a content player device to stream a video over a network from a server for playback of the video by the content player device, the process comprising:

establishing an internet connection between the content player device and the server, wherein the server accesses a plurality of streams including a low quality stream, a medium quality stream, and a high quality stream, wherein the low quality stream, the medium quality stream, and the high quality stream each comprise a group of streamlets encoded at a respective one of a plurality of different bitrates, each group comprising at least first and second streamlets, each of the streamlets corresponding to a portion of the video; wherein at least one of the low quality stream, the medium quality stream, and the high quality stream is encoded at a bitrate of no less than 600 kbps; and wherein the first streamlet of each of the groups of streamlets has the same first duration and encodes the same first portion of the video in the low quality stream, the medium quality stream, and the high quality stream, the first streamlet of the low quality stream having a different bitrate than the first streamlet of the high quality stream and the first streamlet of the medium quality stream;

selecting, by the content player device, a currently selected one of the low quality stream, the medium quality stream, and the high quality stream based upon a determination by the content player device to select a higher or lower bitrate version of the video;

placing a streamlet request over one or more internet connections from the content player device to retrieve the first streamlet storing the first portion of the video; and receiving the requested streamlet from the server via the internet connection; and rendering, by the content player device, the received streamlet for playback of the video.

29. The process of claim 28, wherein the video includes archived content.

30. The process of claim 28, wherein the video is a live event video.

* * * * *